United States Patent [19]
Kusaki et al.

[11] Patent Number: 5,749,053
[45] Date of Patent: May 5, 1998

[54] MOBILE COMMUNICATION NETWORK AND CONTROL METHOD THEREOF

[75] Inventors: Tsutomu Kusaki, Yokohama; Toshiya Ouchi, Tokyo; Shiro Tanabe, Hidaka; Ken Nanjo; Takeshi Maki, both of Yokohama, all of Japan

[73] Assignee: Hitachi, Ltd., Tokyo, Japan

[21] Appl. No.: 516,394

[22] Filed: Aug. 17, 1995

[30] Foreign Application Priority Data

Aug. 24, 1994 [JP] Japan ................... 6-199232

[51] Int. Cl.[6] .................. H04B 7/00; H04Q 7/20
[52] U.S. Cl. .................. 455/524; 455/510; 455/517
[58] Field of Search ................... 455/33.1, 54.1, 455/54.2, 56.1, 422, 433, 435, 507, 510, 517, 524; 379/58–59

[56] References Cited

U.S. PATENT DOCUMENTS

| | | |
|---|---|---|
| 5,040,177 | 8/1991 | Martin et al. . |
| 5,101,500 | 3/1992 | Marui ................... 455/56.1 |
| 5,157,709 | 10/1992 | Ohtera ................... 455/56.1 |
| 5,212,822 | 5/1993 | Fukumine et al. ................... 455/56.1 |
| 5,303,285 | 4/1994 | Kerihuel et al. . |
| 5,323,446 | 6/1994 | Kojima et al. ................... 455/54.2 |
| 5,345,448 | 9/1994 | Keskitalo ................... 370/337 |
| 5,353,331 | 10/1994 | Emery et al. ................... 379/58 |
| 5,361,396 | 11/1994 | Onoe et al. ................... 455/56.1 |
| 5,379,451 | 1/1995 | Nakagoshi et al. ................... 455/54.2 |
| 5,542,094 | 7/1996 | Owada et al. ................... 455/56.1 |
| 5,561,854 | 10/1996 | Antic et al. ................... 455/56.1 |
| 5,574,983 | 11/1996 | Douzono et al. ................... 455/56.1 |
| 5,579,535 | 11/1996 | Orlen et al. ................... 455/56.1 |

FOREIGN PATENT DOCUMENTS

| | | |
|---|---|---|
| WO 94/16531 A1 | 1/1993 | WIPO . |
| WO 94/05129 | 3/1994 | WIPO . |

*Primary Examiner*—Chi H. Pham
*Assistant Examiner*—Gertrude Arthur
*Attorney, Agent, or Firm*—Antonelli, Terry, Stout, & Kraus, LLP

[57] ABSTRACT

A mobile communication network is provided with a plurality of base stations each of which communicates with a plurality of mobile stations, a plurality of base station controllers (BSC) or control stations each of which is connected to a group of base stations, and switching centers each of which is connected to a plurality of BSC's. The BSC's are interconnected by an exclusive network and terminal information of the mobile stations are stored by the respective local service points (SCP) of the BSC's in a decentralized manner. When an authentication processing and the retrieval of location data for a mobile station is to be made by each BSC and in the case where necessary terminal information is not held in the local SCP of that BSC, the BSC broadcasts a request message for transfer of terminal information or vicarious execution of authentication processing to other BSC's through the exclusive network and waits for a response message from a BSC in which the necessary terminal information is held.

20 Claims, 26 Drawing Sheets

FIG. 11A

TERMINAL INFORMATION IN BSC 120a  500a

| MS NO. | BASE STATION ADDRESS | | | AUTHENTICATION DATA |
|---|---|---|---|---|
| P | MSW | Tr | C | |
| 010 | 2 | 03 | 30 | 123 |
| 011 | 2 | 04 | 40 | 563 |
| 012 | 2 | 04 | 41 | 371 |
| 013 | 1 | 01 | 11 | 920 |
| | | | | |

TERMINAL INFORMATION IN BSC 120b  500b

| MS NO. | BASE STATION ADDRESS | | | AUTHENTICATION DATA |
|---|---|---|---|---|
| P | MSW | Tr | C | |
| 020 | 1 | 01 | 10 | 648 |
| 021 | 1 | 02 | 21 | 964 |
| 022 | 2 | 04 | 40 | 472 |
| | | | | |
| | | | | |

FIG. 11C

TERMINAL INFORMATION IN BSC 120c  500c

| MS NO. | BASE STATION ADDRESS | | | AUTHENTICATION DATA |
|---|---|---|---|---|
| P | MSW | Tr | C | |
| 030 | 1 | 01 | 11 | 426 |
| 031 | 1 | 01 | 11 | 934 |
| 032 | 2 | 03 | 31 | 220 |
| 033 | 1 | 02 | 20 | 327 |
| 034 | 2 | 04 | 40 | 887 |

FIG. 11D

TERMINAL INFORMATION IN BSC 120d  500d

| MS NO. | BASE STATION ADDRESS | | | AUTHENTICATION DATA |
|---|---|---|---|---|
| P | MSW | Tr | C | |
| 040 | 1 | 02 | 20 | 556 |
| 041 | 2 | 03 | 31 | 314 |
| 042 | 1 | 01 | 11 | 770 |
| | | | | |
| | | | | |

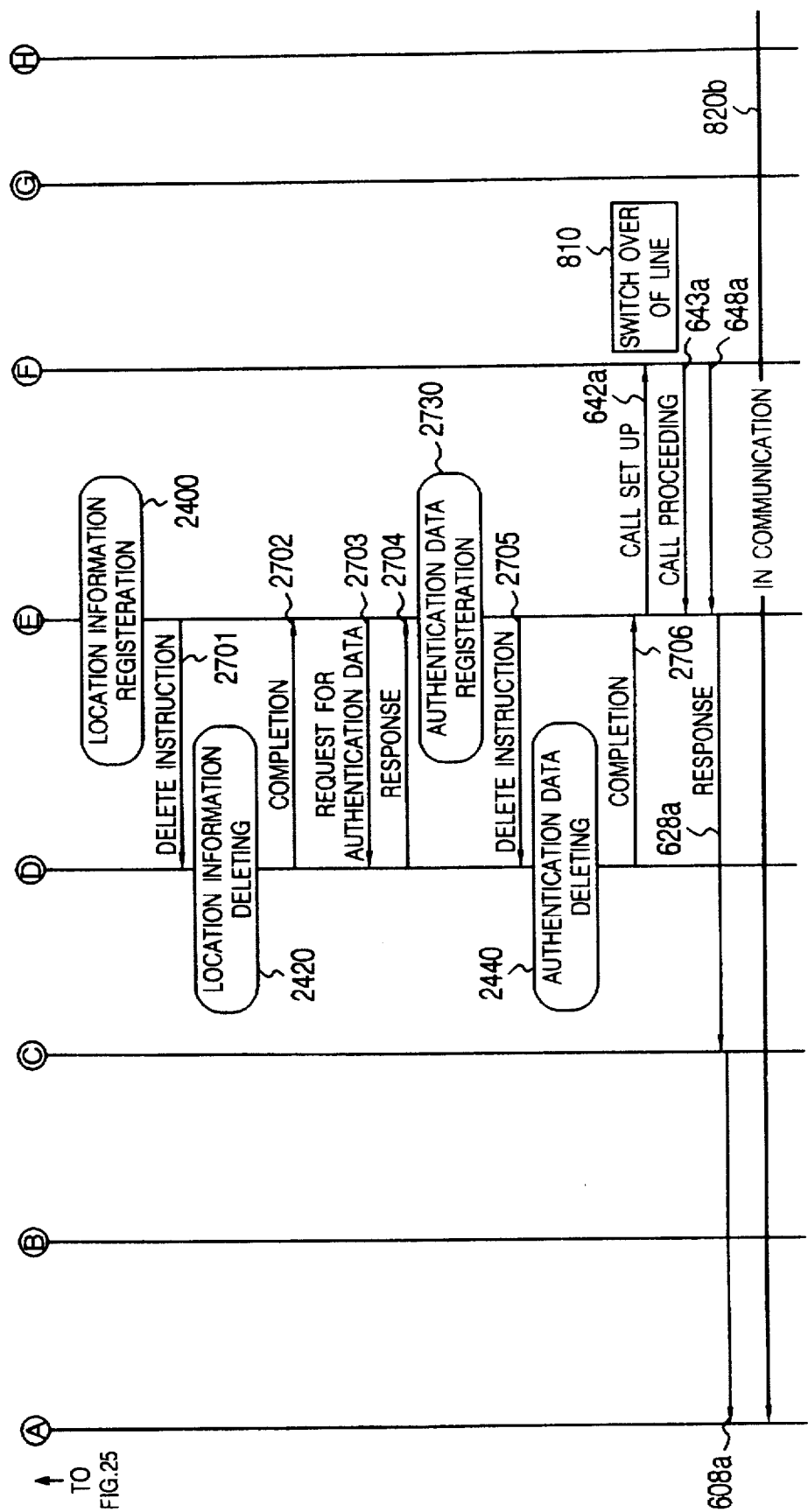

MOBILE COMMUNICATION NETWORK AND CONTROL METHOD THEREOF

BACKGROUND OF THE INVENTION

1. Field of the Invention

The present invention relates to a mobile communication network, and more particularly to a mobile communication network including a plurality of base station controllers (BSC) each of which controls a plurality of base stations and a method of controlling such a mobile communication network.

2. Description of the Related Art

One example of a control system for mobile communication network includes a "home memory type" system disclosed by, for example, PLAIN DIGITAL MOBILE COMMUNICATION written by Ryoichi Tanaka and published by the Telecommunications Association.

In the home memory type mobile communication network, terminal information such as location information and authentication information for all mobile stations (MS) is stored in a centralized manner by a data base (hereinafter referred to as DB) of a service control point device (hereinafter referred to as SCP) connected to or incorporated in one or a small number of specific or home switching centers (SWC) with mobile communication function (hereinafter referred to as switching centers). When there is the need of terminal information for a certain mobile station, a switching center of an origination side (or calling party) refers to a routing table to confirm a home switching center of that mobile station and inquires of the confirmed home switching center about the terminal information.

According to the home memory type mobile communication network, the monitoring and control of location information and terminal status becomes relatively easy because of the centralized control of all terminal information by the DB of SCP. However, the conventional home memory type mobile communication network involves a problem that the increase in number of subscribers is accompanied with a scarcity of storage capacity of the DB and a problem that there occures the concentration of traffics for making the access to the DB.

One system for solving such problems includes a "broadcast type" mobile communication network disclosed by, for example, JP-A-63-111737.

In the broadcast type mobile communication system, a plurality switching centers make a decentralized control of terminal information or each switching center stores terminal information for a plurality of mobile stations accommodated by a base station (BS) which is in a coverage area or under the control of that switching center. When a switching center to control a certain mobile station is changed as that mobile station moves, terminal information such as location information is transferred to a DB of a switching center which is at the destination of that mobile station. For example, in the case where a call set up is to be made for a certain mobile station (or destination terminal), a switching center on the origination side (or calling party side) inquires of all switching centers about terminal information of the destination terminal and makes a call set up on the basis of terminal information transmitted from a switching center in which the terminal information of the destination terminal is stored. According to this broadcast type network, the problem of the scarcity of storage capacity and the concentration of traffics attendant upon the increase in number of subscribers can be solved since terminal information is stored in a decentralized manner by a plurality of DB's.

In the conventional home memory type mobile communication network, the control of subscriber information is relatively easy since the subscriber information is stored in a centralized and fixed manner, as mentioned above. However, there is a problem that the traffic density of a signal network connected to a home memory is increased and the amount of information to be processed by a processor in the SCP controlling the home memory is increased for a request for information from another device.

Since the above-mentioned signal network is used for transfer of an ordinary call control signal and the SCP is used for the provision of an intelligent network (IN) service, the above-mentioned increases in traffic density and in amount of information to be processed as mentioned above result in the delay of a processing for ordinary call and IN service. Also, since the home memory type mobile communication network requires a routing table for routing an information request message from each mobile station to the home memory, there is the problem that the control of the routing table becomes complicated as the number of subscribers is increased.

On the other hand, the conventional broadcast type mobile communication network has a merit that the problem of the scarcity of storage capacity of DB is solved and the concentration of traffics to SCP and the amount of information to be processed can be reduced. However, when terminal information is to be retrieved, it is necessary to broadcast an information request message from one switching center to all other switching centers. Accordingly, there is a problem that the traffic density of a control signal network between switching centers is increased and the amount of information to be processed by a processor in each switching center for the above-mentioned information request message is increased. In this case, since the control signal network is connected to the SCP so that it also serves a signal network used for an ordinary call processing, a processing for ordinary call is delayed even in the case of the broadcast type network as in the case of the home memory type network. Also, in the case where the existing home memory type network is changed to the broadcast type network, a great change is required for a protocol and so forth. The future increase in number of subscribers forecast with the personalization of communication has a fear of bringing about a shortage of terminal or MS number in the existing dial number scheme used for the purpose of reducing a routing load.

SUMMARY OF THE INVENTION

An object of the present invention is to provide a mobile communication network and a method for control thereof which can solve the above problem of traffic and amount of information to be processed by a processor in the conventional home memory network.

Another object of the present invention is to provide a mobile communication network and a control method thereof in which no routing table is required for a base station controller connected between a base station and a switching center.

A further object of the present invention is to provide a mobile communication network and a control method thereof in which a flexible number scheme can be realized.

To that end, a mobile communication network of the present invention is characterized in that data bases (DB) for storing terminal information such as location data and authentication data concerning mobile stations are decentrally disposed in a plurality of base station controllers (BSC) for wireless/wire service conversion each of which is connected between a switching center and a plurality of base stations, and the plurality of base station controllers are connected by an exclusive network for communication of the terminal information.

More particularly, the access to the data base having terminal information stored therein is made by a local SCP provided in each base station controller. Each local SCP has a function of making, upon reception of a request for terminal information from a mobile station or a switching center for call connection, location registration or the like, the judgement of whether or not objective terminal information is possessed by a DB of that local SCP, a function of broadcasting a request message for terminal information or a request message for a processing using the terminal information to other base station controllers through the exclusive network, as required, and a function of responding to a request message broadcasted by another base station controller and received from the exclusive network to judge whether or not the objective terminal information is possessed by that local SCP and for performing a communication operation corresponding to the request message.

In a preferred embodiment of the present invention, each local SCP is provided with a transceiver unit connected to the exclusive network, a content-addressable memory (CAM) for storing an identifier (ID) of a mobile station and a memory address of terminal information thereof in a DB in association with each other, and a special purpose processor for controlling the transceiver unit and the content-addressable memory.

In the mobile communication network of the present invention, each base station controller (BSC) makes, when a request message for call connection or location registration is received from a mobile station through a base station or from a switching center through a network, or when a request message broadcasted by another base station controller is received from the exclusive network, the judgement by the local SCP as to whether or not objective terminal information is possessed by that base station controller. In the case where the objective terminal information is possessed, that is, in the case where the base station controller under consideration is a home BSC for the designated mobile station, the base station controller under consideration performs a predetermined procedure by use of the terminal information. If the terminal information is retrieved by the request message from the other base station controller, the base station controller under consideration transmits the terminal information to the requesting base station controller through the transceiver unit or performs the predetermined procedure using the terminal information in place of the requesting base station controller. In the case where the objective terminal information is not possessed by the base station controller and if the terminal information is, for example, information which concerns a mobile station in a cell being now covered by the base station controller under consideration and is needed by that base station controller under consideration itself, the base station controller under consideration broadcasts a request message for transfer of the terminal information or a request message for vicarious execution of a communication procedure to other base station controllers by use of the exclusive network.

With a construction in which each local SCP is provided with a special purpose processor for processing of the above-mentioned request message in addition to a content-addressable memory and a general purpose processor for call control, the local SCP can use the content-addressable memory to judge, from mobile station ID included in the request message, whether or not objective terminal information is possessed by its own base station controller. In the case where the base station controller of the local SCP corresponds to a home BSC, the local SCP can acquire the terminal information immediately from its own DB on the basis of the memory address of the objective terminal information obtained from the content-addressable memory. Since the the content-addressable memory and the special purpose processor operate independently of the general purpose processor for performing an ordinary call processing, a location registration processing or a mobile station authentication processing, it is possible to avoid the increase of amount of information to be processed by the general purpose processor.

Also, the use of the content-addressable memory for confirmation of whether or not the terminal information is possessed by the DB enables an operation which is high in speed as compared with a software processing. Thereby, a high-speed processing of an extensive amount of request message transmitted from other base station controllers in a broadcasting fashion becomes possible.

The foregoing and other objects, advantages, manner of operation and novel features of the present invention will be understood from the following detailed description when reading in conjunction with the accompanying drawings.

BRIEF DESCRIPTION OF THE DRAWINGS

FIGS. 11A to 11D are diagrams showing an example of terminal information in data bases of base station controllers 120a to 120d forming the mobile communication network shown in FIG. 10;

FIG. 26 is a sequence diagram showing a second portion of the hand over procedure following the first portion shown in FIG. 25.

DESCRIPTION OF THE PREFERRED EMBODIMENTS

Figure 1:
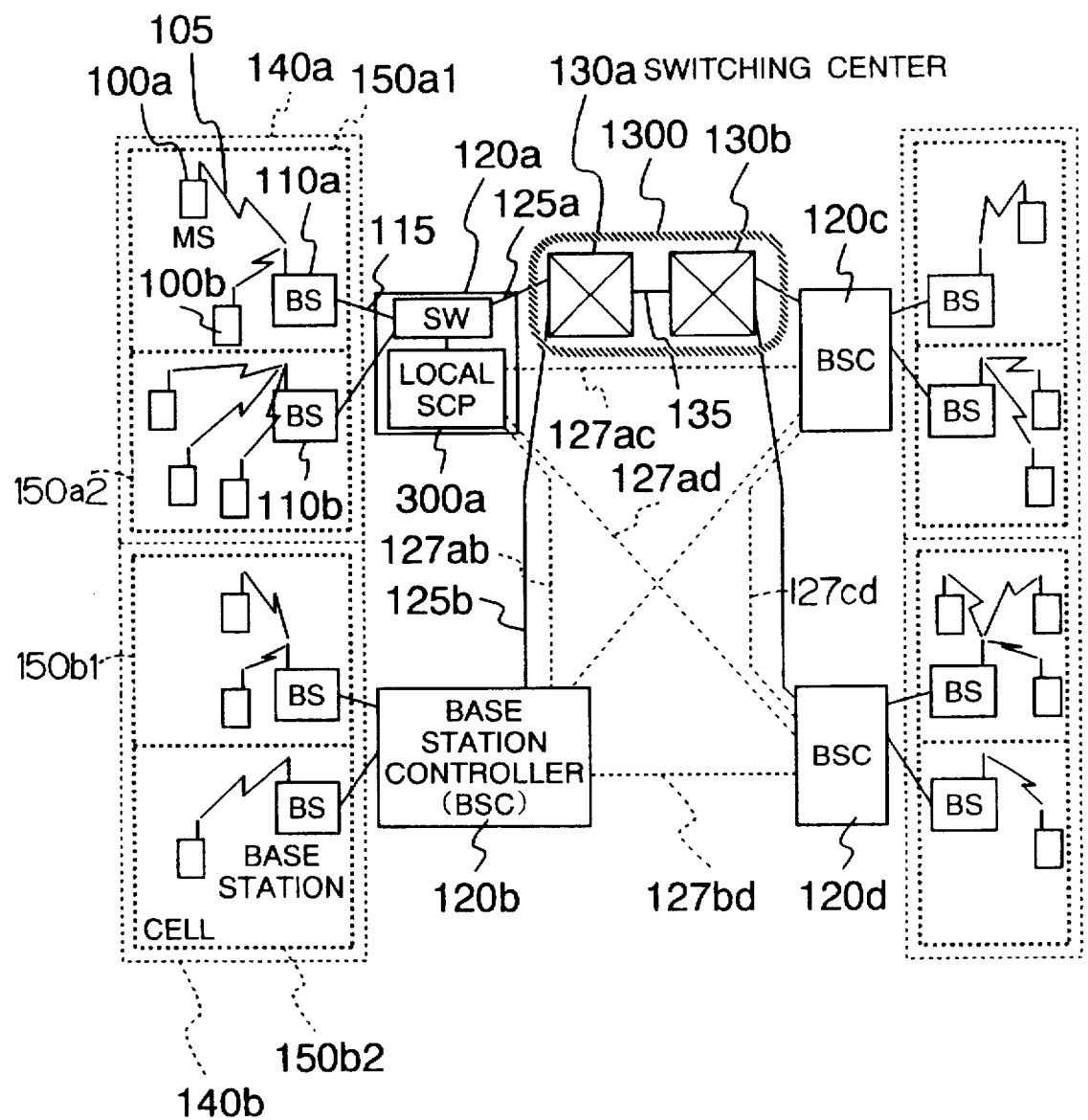
FIG. 1 is a diagram showing the construction of a first embodiment of a mobile communication network according to the present invention.

FIG. 1 shows the schematic construction of a mobile communication network system according to the present invention in which a home memory and broadcast type is employed.

The network system includes a plurality of mobile stations (MS) 100 (100a, 100b, - - - ), a plurality of base stations (BS) 110 (110a, 110b, - - - ) which communicate with the mobile stations through wireless channels, a plurality of base station controllers (BSC) 120 (120a, 120b, - - - ) each of which is connected to a plurality of base stations, and a plurality of switching centers (SWC) 130 (130a, 130b, - - - ) with mobile communication function each of which is connected to a plurality of base station controllers. The plurality of switching centers 130 form a network 1300 between switching centers.

Each base station 110 forms a predetermined cell zone or cell area (hereinafter referred to as cell) 150 (150a1–150b2) and performs transmission and reception for a plurality of mobile stations existing in the cell. Reference numeral 140 (140a, 140b, - - - ) denotes a paging area (or location registration area) formed by one of plural cells. At the time of paging to mobile stations, an alerting signal is transmitted simultaneously in units of one paging area or to all mobile stations in the paging area.

The base station controller 120 has a function as a transceiver for a broadcast message which is one feature of the home memory type network and a function as a home BSC for storing information concerning a part of mobile stations in a predefined network. There are provided a wireless link 105 which connects the mobile station 100 and the base station 110, a link 115 which connects the base station 110 and the base station controller 120, a link 125 (125a, 125b, - - - ) which connects the base station controller 120 and the switching center 130, a link 135 which connects the switching centers 130, and an exclusive network which includes an exclusive signal line 127 (127ab–127cd) connecting the base station controllers 120.

The exclusive line 127 may connect the base stations 120 through the switching center 130 or the network 1300 between switching centers.

Figure 2:
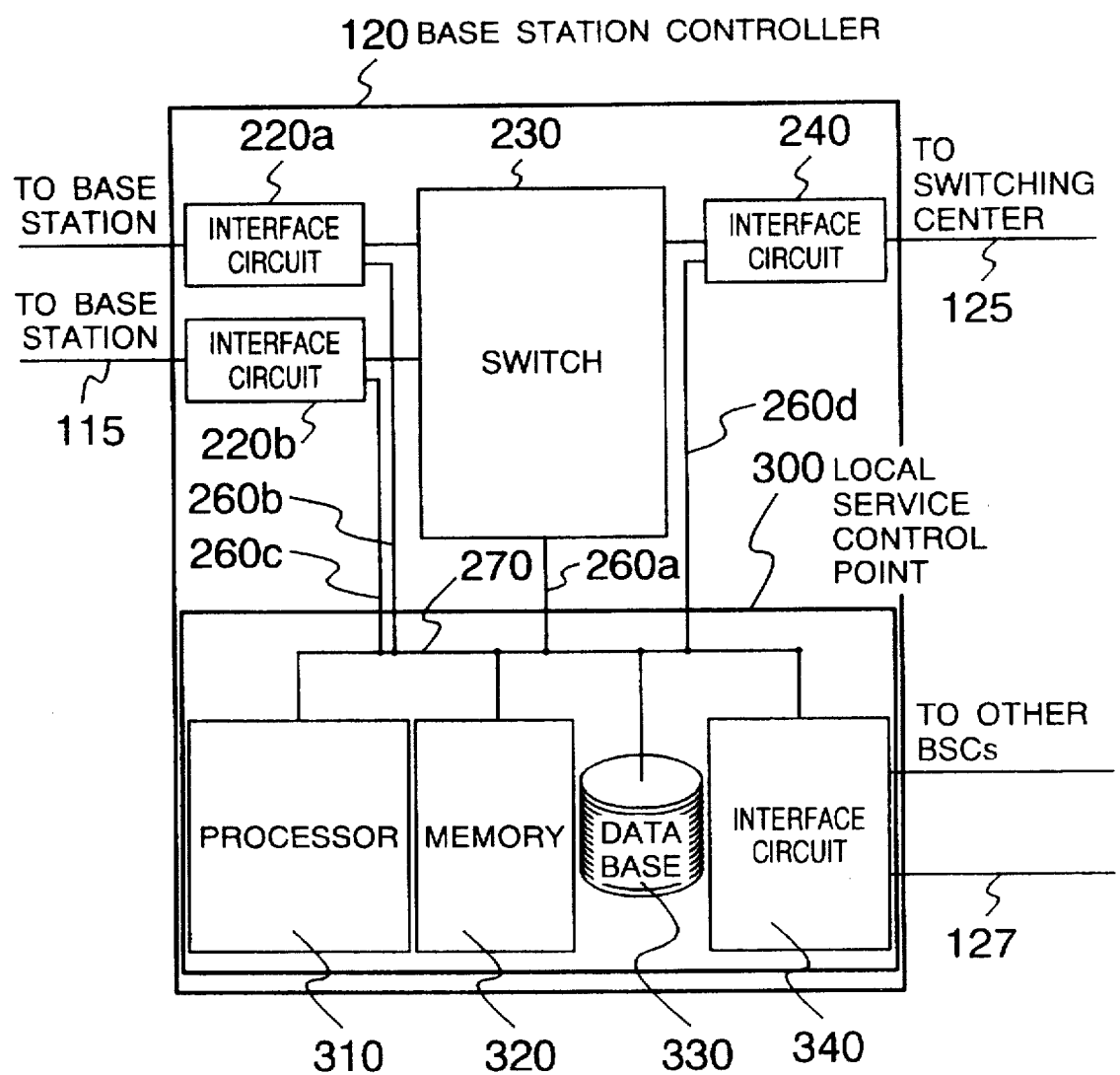
FIG. 2 is a diagram showing an example of the construction of a base station controller for performing a network control in the present invention.

FIG. 2 shows a schematic construction of the base station controller 120 including a local service control point (SCP) 300 which has a signal control function including a broadcasting function.

The base station controller 120 includes a switch 230 for performing a switching process, base station interface (I/F) circuits 220 (220a, 220b, - - - ) connected to the switch 230, a switching center interface (I/F) circuit 240, and a local SCP 300 connected to the switch 130 and the I/F circuits 220 and 240 through buses 260. The local SCP 300 is composed of a processor 310, a memory 320, a data base 330, and a signal line interface (I/F) circuit 340. These components are connected by a link 270. Since the base station controller 120 has a switching function, it can be regarded as being one switching center.

Figure 3:
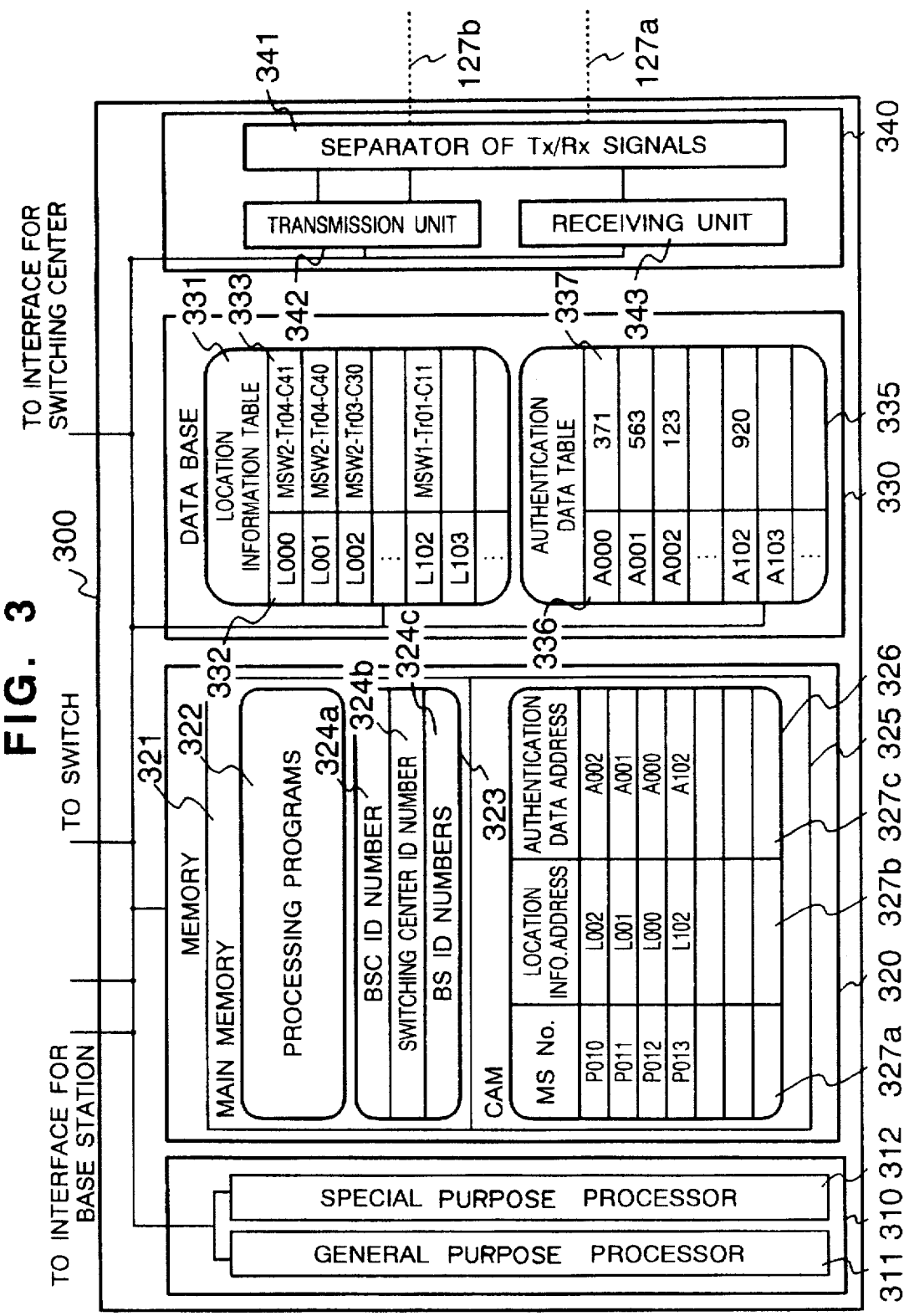
FIG. 3 is a diagram showing the construction of a local SCP provided in the base station controller.

FIG. 3 shows the detailed construction of the local SCP 300.

The local SCP 300 is provided with a processor 310 which includes a special purpose processor 312 for performing a number analysis processing and for making the discrimination of whether or not information of a mobile station having a number obtained by the analysis is held and a general purpose processor 312 for performing the other and general processing inclusive of a call processing.

A memory 320 includes a main memory 321 for storing processing programs 322 as mentioned later on and location information 323 of the base station controller 120 to which the local SCP 300 is connected, and a content-addressable memory (CAM) 325 for storing a terminal information table 326.

The location information table 323 stores the ID (or BSC number) 324a of the base station controller 120, the ID (or SWC number or SWC address) 324b of a switching center which serves as a host device of the base station controller 120 on the communication network, and the ID (or BS number) 324c of base stations which the base station controller 120 controls.

The terminal information table 326 stores information of mobile stations for which the base station controller 120 is a home BSC, that is, the ID (or MS number) 327a of the related mobile station, an address 327b indicating the memory location of location information of the mobile station, and an address 327c indicating the memory location of authentication data.

The data base 330 includes a table 331 for storing information 333 of the mobile stations and a table 335 for storing authentication data 337. In the example shown in FIG. 3, the contents and data format of the content-addressable memory 325 and the data base 330 are typical. The addresses 327b and 327c stored in the content-addressable memory 325 indicate the addresses 332 and 336 of terminal information stored in the tables of the data base 330, respectively.

In the signal line I/F circuit 340, a transmission unit 342 makes a plurality of copies of a transmission signal at the time of transmission of a message to all the other base station controllers. A receiving unit 343 identifies the type of a received signal.

Figure 4:
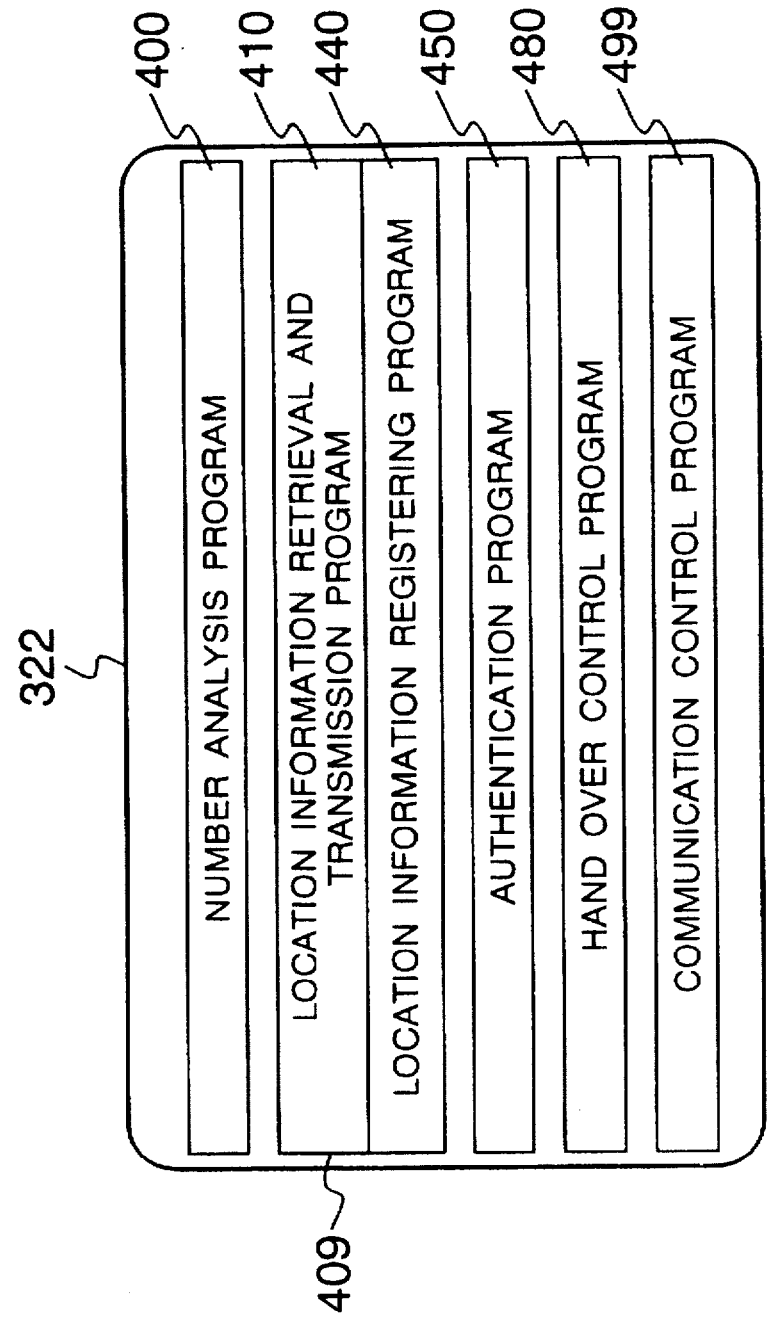
FIG. 4 is a diagram showing a plurality of programs prepared in a memory of the local SCP.

FIG. 4 shows the construction of processing programs 322 prepared in the main memory 321.

The processing programs 322 include a number analysis program 400 for performing a processing for discrimination of the ID number of a given mobile station, programs 409 for processing location information, an authentication program 450 for performing the operation of authentication of the mobile station or the operation of broadcasting of an authentication request message to the exclusive network, a hand over control program 480 for performing a control operation for hand over including the retrieval of idle radio carrier or slot, and a communication control program 499.

The programs 409 for processing location information include a location information retrieval and transmission program 410 for performing the retrieval of location information of a destination mobile station and the operation of transmission of a message at the time of call set up, and a location information registering program 440 for performing the operation of registration and updating of location information of a mobile station.

Figure 5:
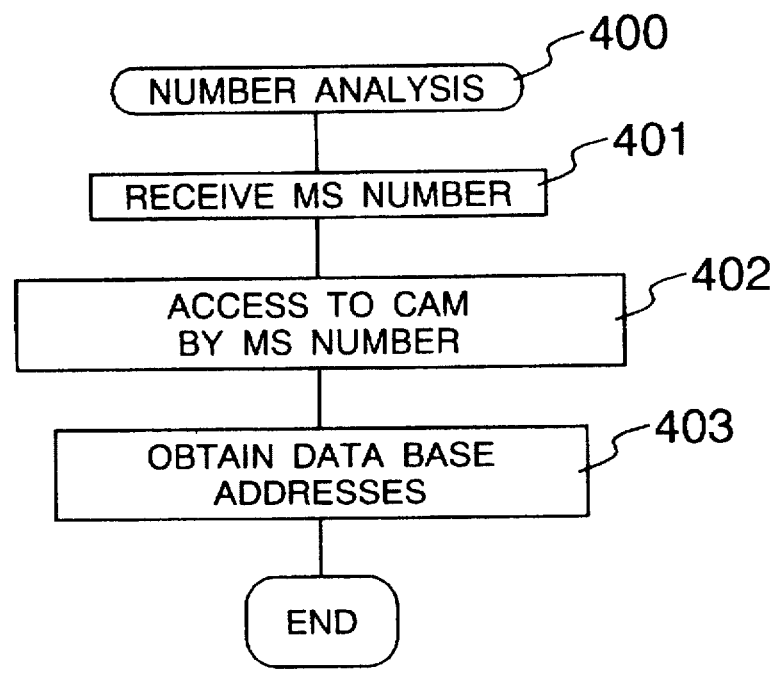
FIG. 5 shows a flow chart of a number analysis program.

FIG. 5 is a flow chart showing the function of the number analysis program 400.

In order that MS numbers designated by a large amount of broadcast messages received from other base station controllers are subjected to an analysis processing so that a load is not imposed upon the general purpose processor, the number analysis program 400 is executed by the special purpose processor 312. Also, the content-addressable memory 325 is used in order to rapidly judge whether or not terminal information (or location information and authentication data) of a mobile station having the designated MS number is possessed by the data base of the base station controller under consideration.

When an MS number is given (step 401), the access to the content-addressable memory is made on the basis of the MS number (step 402) and the presence/absence of objective data (or location information and authentication data) is checked (step 403). With the access to the content-addressable memory, there are obtained a flag indicating the presence/absence of the objective data corresponding to the designated MS number and the address of the objective data (or location information address 327b and authentication data address 327c in the present example), if there is the objective data. For example, when the MS number is "P010" in FIG. 3, addresses "L002" and "A002" are obtained from the content-addressable memory 325.

Figure 6:
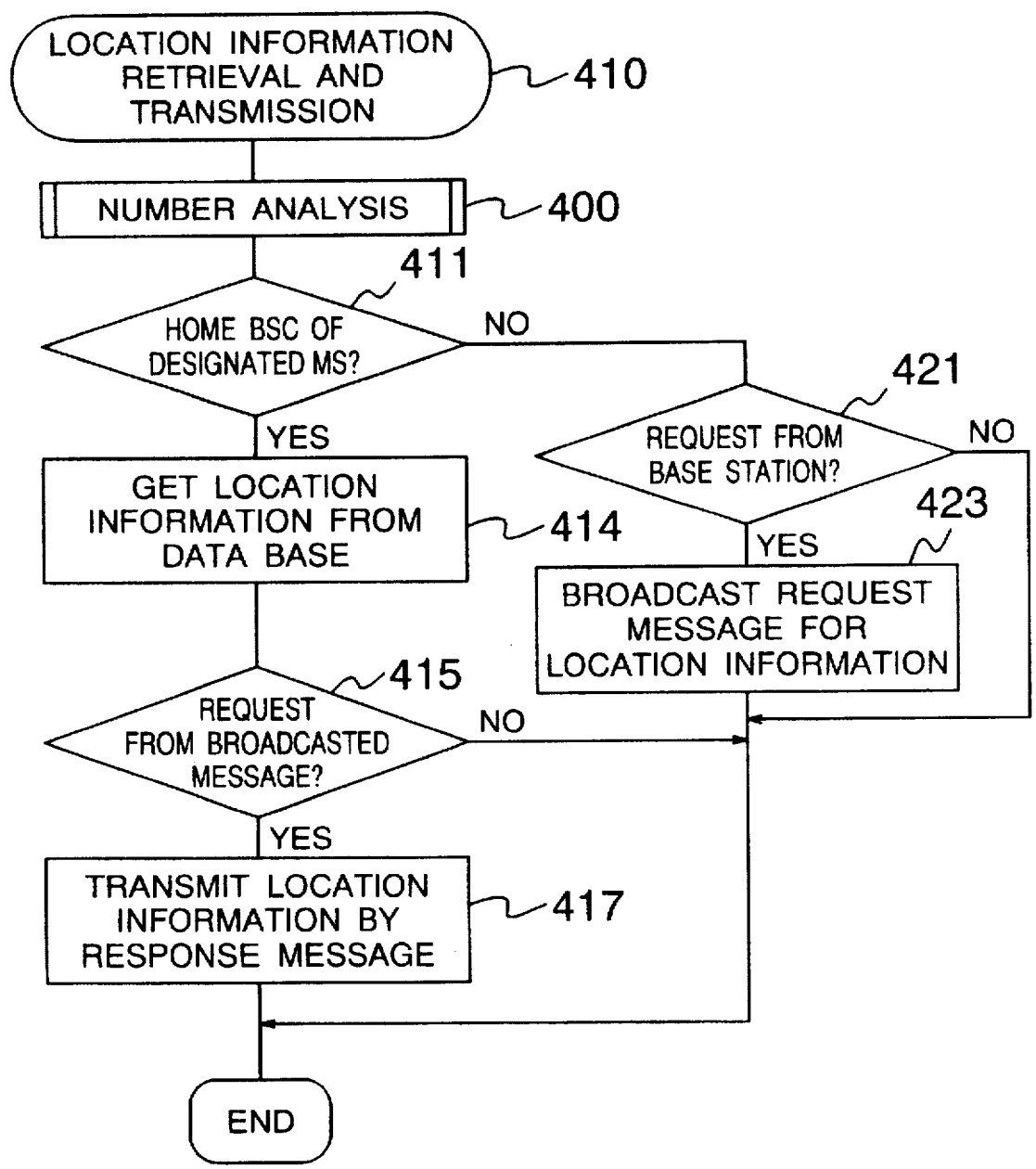
FIG. 6 shows a flow chart of a location information retrieval and transmission program.

FIG. 6 is a flow chart showing the function of the location information retrieval and transmission program 410. This program is executed, for example, in order to know the present location of a destination mobile station (MS) at the time of call set up.

The number analysis shown in FIG. 5 is made for the MS number of a mobile station made the object of retrieval (step 400). From the output of the content-addressable memory 325, the judgement is made as to whether or not the objective terminal information 327a to 327c concerning the mobile station having the above MS number is stored in the data base, that is, whether or not the base station controller under consideration is a home BSC for the mobile station made the object of retrieval (step 411). In the case where the objective terminal information is managed by the base station controller under consideration, the location information table 331 is searched on the basis of the location address information 327b to acquire a base station address (host node address (SWC number)BSC number-BS number) 333 stored as the location information of the mobile station made the object of retrieval(step 414).

Next, the judgement is made as to whether or not the ID number of the mobile station made the object of retrieval is given by a request message for location information broadcasted from a base station controller other than the base station controller under consideration (step 415). In the case where the result of judgement is affirmative, a location information response message including the above-mentioned location information 333 is transmitted to the source or requesting base station controller of the request message (step 417), thereby completing this routine. In the case where the result of judgement in step 415 is negative, that is, in the case where the above MS number is given by a message (or request for call set up) from any base station which is under the control of the base station controller under consideration, this routine is completed in a state in which the location information is held.

In the case where the result of judgement in step 411 determines that the objective terminal information is not managed by the base station controller under consideration, that is, in the case where the base station controller under consideration is not a home BSC for the mobile station made the object of retrieval, the judgement is made as to whether or not the above MS number is given by a message received from any base station which is under the control of the base station controller under consideration (step 421). In the case where the result of judgement is affirmative, a request message for location information including the ID number of the mobile station made the object of retrieval is generated and is broadcasted to other base station controllers through the exclusive network (step 423), thereby completing this routine. In the case where the result of judgement in step 421 is negative, that is, in the case where the MS number is given by a request message issued by any other base station controller, this routine is completed without performing any specific response operation.

Consider as one example the case where a request message for location information with MS number "P011" made the object of retrieval is received by the base station controller 120 from another base station controller through the exclusive signal line I/F circuit 340. As the result of number analysis of MS number "P011" (step 400), location information address "L001" is obtained from the content-addressable memory 325 and a base station address "MSW2-Tr04-C40" as location information is acquired from the address "L001" of the data base 330 (step 414). In this case, since the above MS number is given by the request message broadcasted by the other base station controller, the location information is transmitted by a response message to the source base station controller of the request message through the exclusive signal line I/F circuit 340 (step 417).

Figure 7:
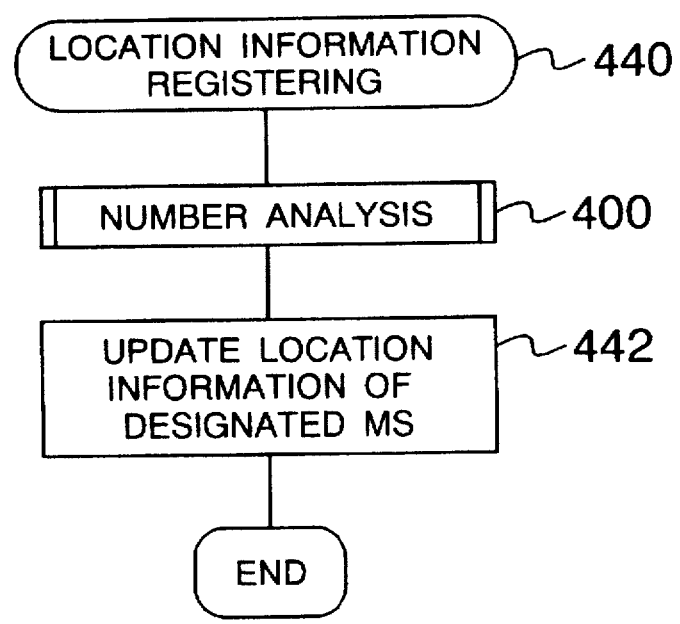
FIG. 7 shows a flow chart of a location information registering program.

FIG. 7 is a flow chart showing the function of the location information registering program 440.

This program is executed when a request for location registration is received from a base station which is at the destination of a mobile station. First, a number analysis is made for an MS number designated by the request message for location registration (step 400) to obtain a location information address 327b from the content-addressable memory 325. The access to the location information table 331 is made on the basis of the address 327b so that location information (or base station address) of the designated mobile station stored at the corresponding address position is updated to the present location (or base station address) of the mobile station indicated by the request message for location registration (step 442), thereby completing this routine.

Figure 8:
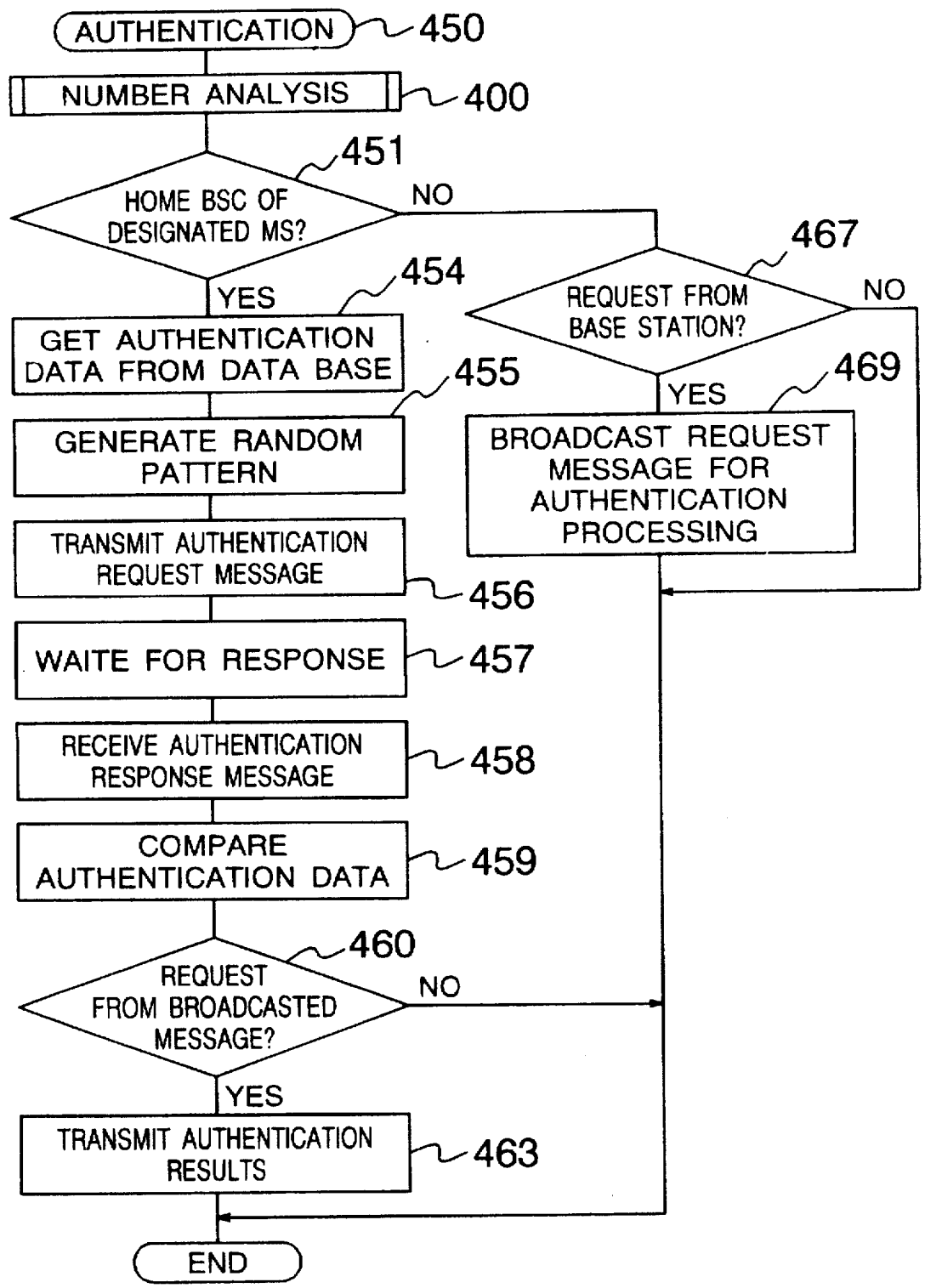
FIG. 8 shows a flow chart of an authentication processing program.

FIG. 8 is a flow chart showing the authentication program 450.

This program is executed, for example, when a base station controller receives a request message for call set up from a base station which is under the control of the base station controller under consideration or a request message for authentication processing from another base station controller.

A number analysis is made for a given MS number (step 400). On the basis of the contents of the content-addressable memory 325, the judgement is made as to whether or not the base station controller under consideration is a home BSC of the designated mobile station having the given MS number (step 451).

In the case where the base station controller under consideration is a home BSC of the designated mobile station, the access to the authentication data table 335 is made on the basis of the address 327c of authentication data (or key code for encipherment) obtained by the number analysis to acquire authentication data 337 of the designated mobile station (454). Next, a random pattern is generated (step 455) and enciphered authentication data obtained by enciphering the authentication data by the random pattern 337 is held. At the same time, an authentication request message including the random pattern is generated and is transmitted to the source base station or base station controller of the received request message (or MS number) (step 456). Then, the base station controller under consideration waits for the reception of an authentication response message from the source base station or base station controller (step 457). The authentication response message includes enciphered authentication data obtained by enciphering authentication data held by the designated mobile station by the above random pattern.

When the authentication response data is received (step 458), the enciphered authentication data included in the authentication response message is compared with the authentication data held by the base station controller under consideration to authenticate the validity of the designated mobile station (step 459). Next, the judgement is made as to whether or not the above MS number is given by a request message broadcasted from another base station controller (step 460). If the result of judgement is affirmative, a message indicating the result of authentication is transmitted to the source base station controller of the request message (step 463). If the result of judgement in step 460 is negative (or if the request message is given from a base station which is under the control of the base station controller under consideration), this routine is completed without transmitting the message indicating the result of authentication.

On the other hand, in the case where the result of judgement in step 451 determines that the base station controller under consideration is not a home BSC of the designated mobile station, the judgement is made as to whether or not the above MS number is given by a request message from a base station which is under the control of the base station controller under consideration (step 467). If the result of judgement is affirmative, a request message for authentication processing inclusive of the above MS number is generated and is broadcasted to other base station controllers through the exclusive network (step 469). If the result of judgement in step 467 is negative, this routine is completed without responding to the requesting base station controller.

Consider as one example the case where the base station controller 120 shown in FIG. 3 receives a request message for authentication processing inclusive of MS number "P013" from another base station controller.

The base station controller 120 makes the number analysis for the MS number "P013" (step 400) to obtain authentication data address "A102" corresponding to the MS number from the content-addressable memory 325 and acquires authentication data 920 from the data base (step 454). Next, an authentication request message including a random pattern generated in step 455 is transmitted from the base station controller 120 to the source base station controller of the request message for authentication processing (step 456). When receiving an authentication response message, the base station controller 120 compares enciphered authentication data included in the authentication response message with enciphered authentication data held by the base station controller 120 itself (step 459). In this case, the base station controller 120 transmits a message indicative of the result of authentication processing (authentication completion message or authentication failure message) to the source base station controller of the request message for authentication processing (step 463), thereby completing this program routine.

Figure 9:
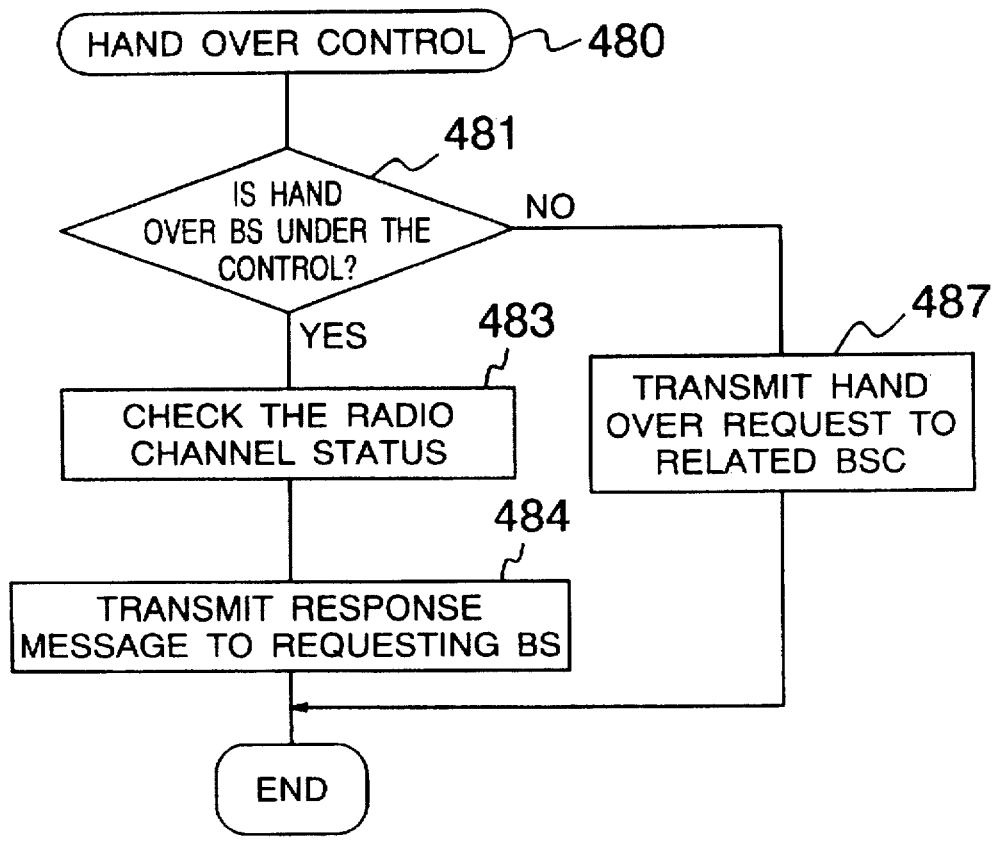
FIG. 9 shows a flow chart of a hand over control program.

FIG. 9 is a flow chart showing the function of the hand over control program 480.

When a hand over inquiry message is received, the judgement of whether or not a hand over base station at the destination of change over of a traffic channel is under the control of the base station controller under consideration is made from the address of the hand over base station indicated by the message and the contents of the location information area 323 of the main memory (step 481). In the case where the hand over base station is under the control of the base station controller under consideration, radio channel status information indicating idle channel or idle slot is checked (step 483). And, a response message to hand over inquiry including the radio channel status information is generated and is transmitted to the source base station of the hand over inquiry message (step 484), thereby completing this routine.

On the other hand, in the case where the judgement in step 481 determines that the hand over base station is not under control of the base station controller under consideration, the hand over inquiry message is transmitted to another base station controller which accommodates the hand over base station (step 487), thereby completing this routine.

The communication control program 499 performs all other communication controls (such as call connection, release, disconnection) other than the above-mentioned processings in the base station controller.

Next, explanation referring to FIGS. 10 to 14 will be made of a call connection processing between mobile stations including a sequence in which one base station controller broadcasts a terminal information inquiry message concerning a specified mobile station to a plurality of other base station controllers to obtain a response to the inquiry.

Figure 10:
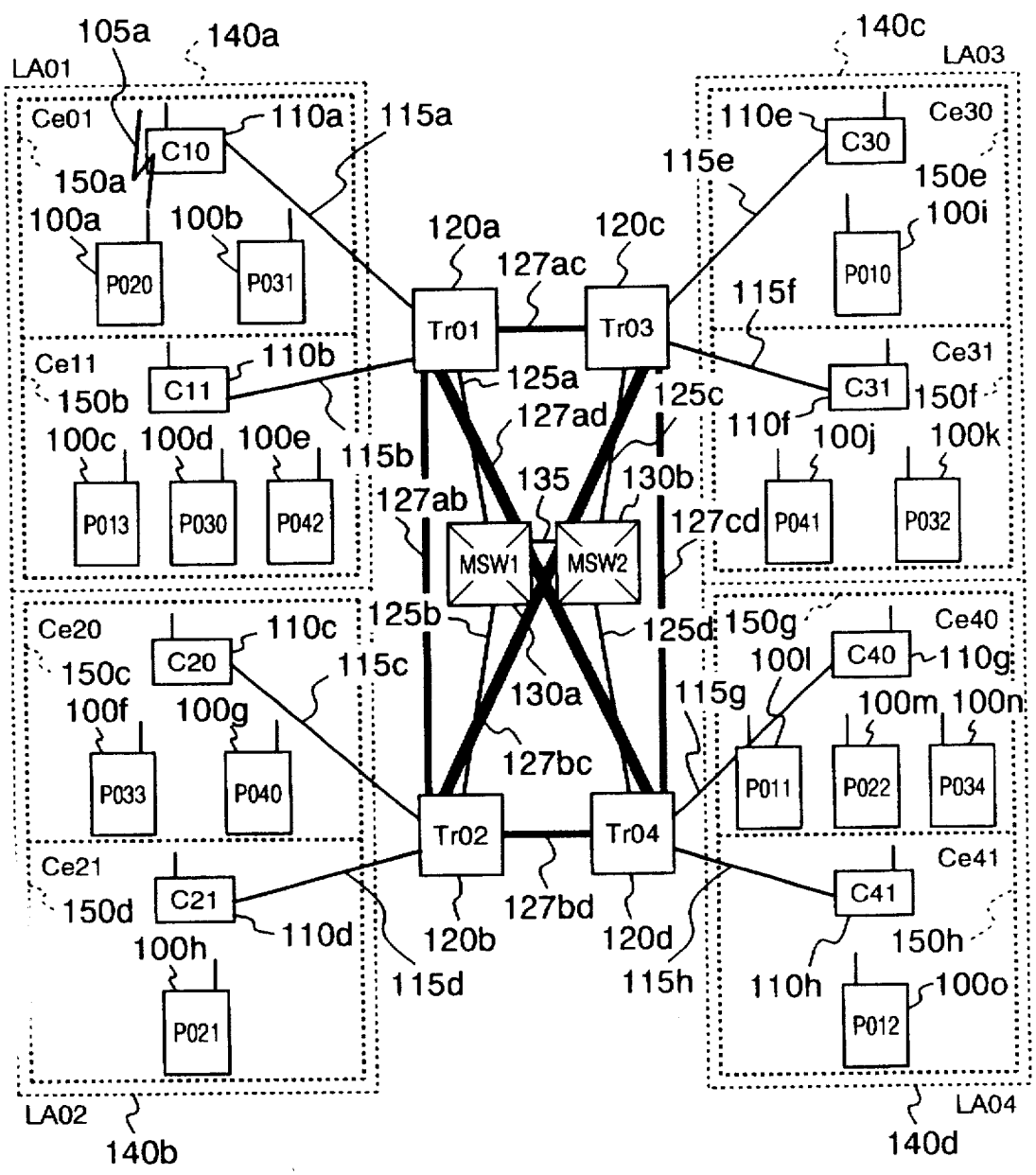
FIG. 10 is a diagram showing ID numbers of respective constitution elements for explaining the operation of the mobile communication network shown in FIG. 1.

A mobile communication network shown in FIG. 10 has a construction similar to that of the network shown in FIG. 1. In FIG. 10, symbols in blocks showing mobile stations 100 (100a to 100o), base stations 110 (110a to 110h), base station controllers 120 (120a to 120d) and switching centers 130 (130a, 130b) represent the ID numbers of the respective devices.

Tables 500a to 500d shown in FIGS. 11A to 11D represent the contents of MS number 327a, base station address 333 and authentication data 337 which are stored in the content-addressable memories and data bases of the base station controllers 120a to 120d.

Figure 12:
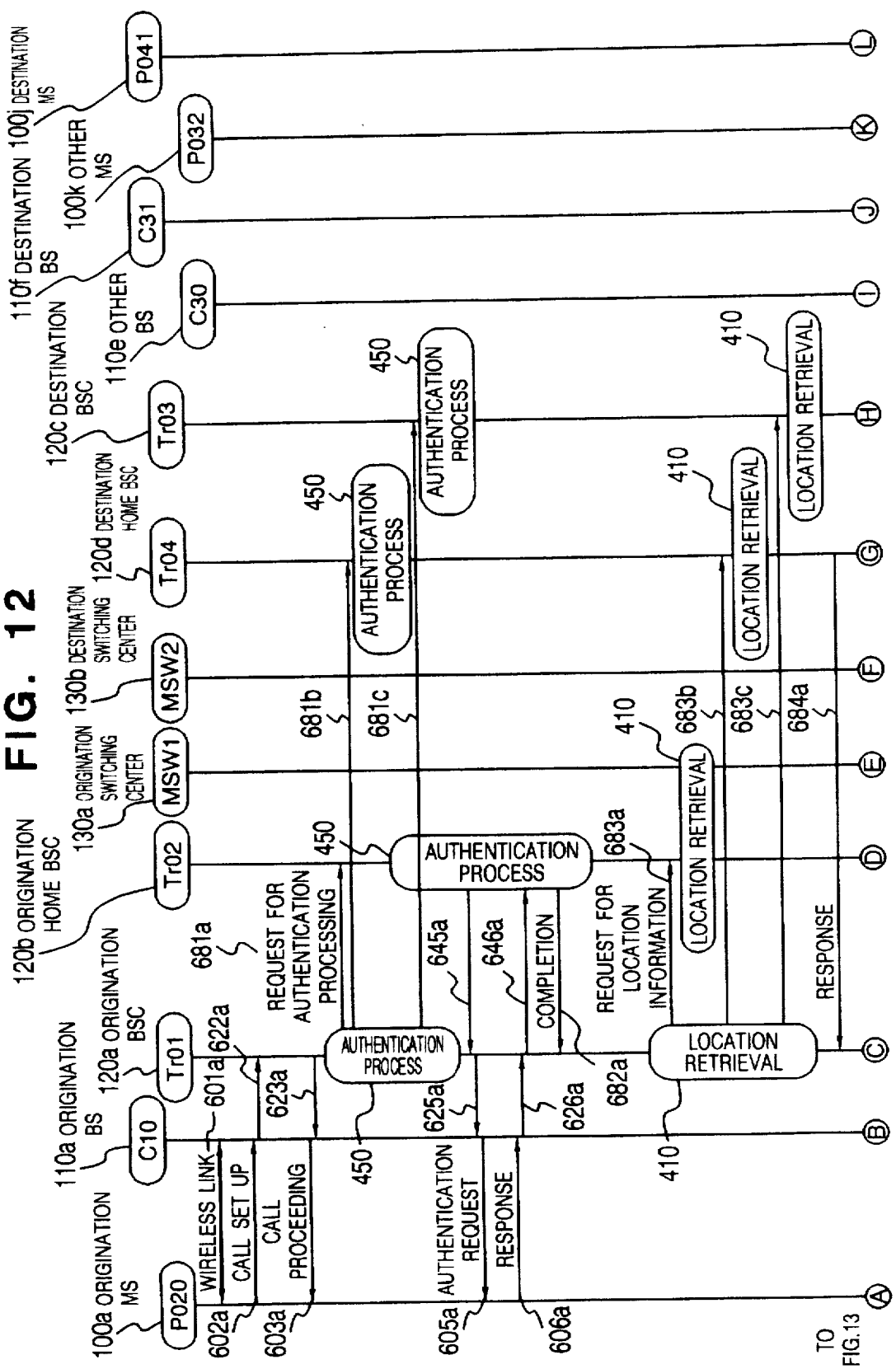
FIG. 12 is a sequence diagram showing a first portion of a call set up procedure in the mobile communication network shown in FIG. 10.
Figure 13:
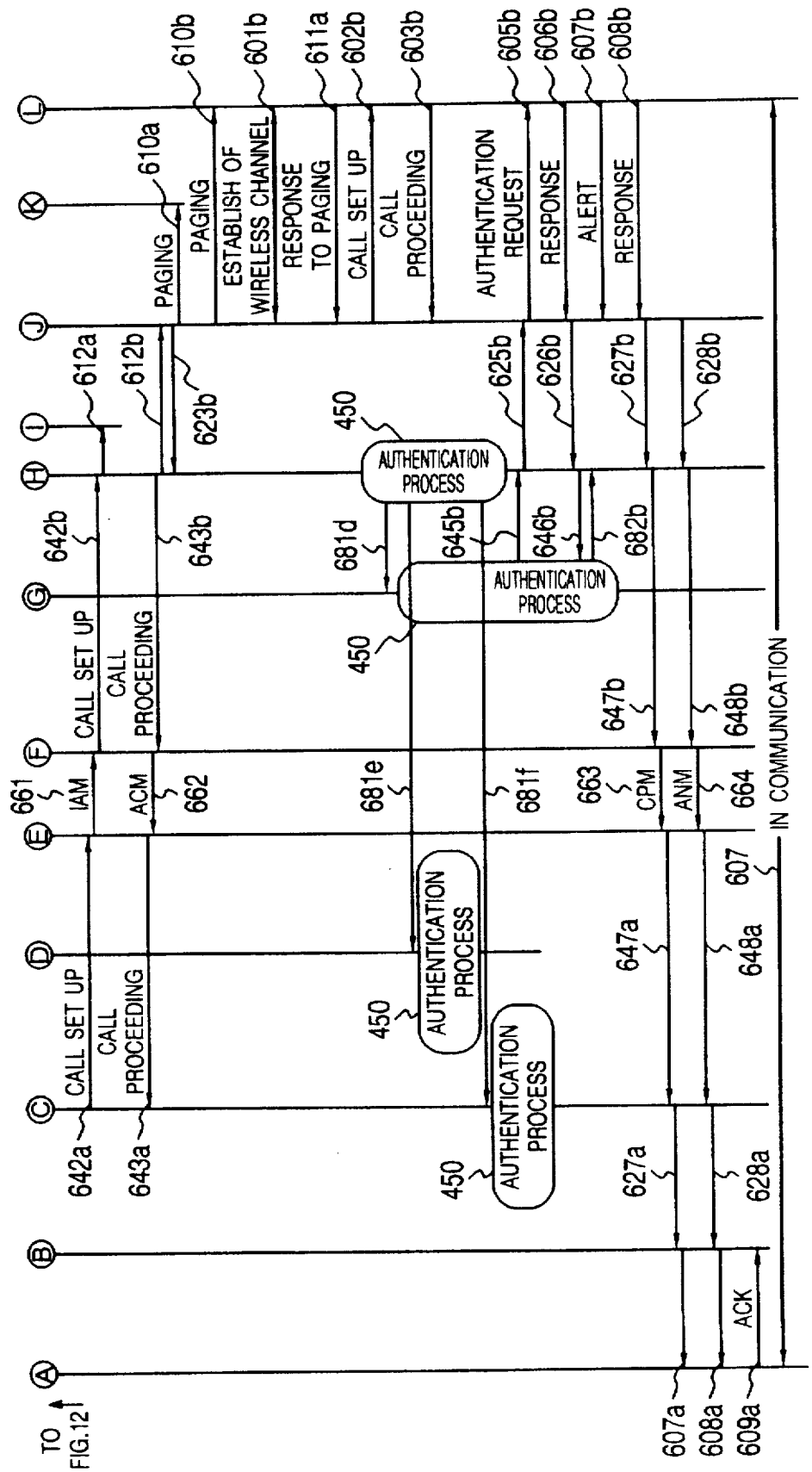
FIG. 13 is a sequence diagram showing a second portion of the call set up procedure following the first portion shown in FIG. 12.

FIGS. 12 and 13 respectively show the former and latter portions of a signal sequence in the mobile communication network shown in FIG. 10.

In the following explanation, a message communicated between a mobile station and a base station conforms to "RCR STD-28", a message between a base station and a base station controller and a message between a base station controller and a switching center conform to "TTC (The telecommunication technology Committee) JT-Q931-B" and "TTC JT-Q932-A", and a message between switching centers conforms to "ITU-T Q.763". A message newly defined in the present invention will be appended with symbol "*" at a location where it first appears in the description of the present embodiment.

Consider, as one example of call connection, the case where a mobile station 10a with MS number "P020" positioned in a cell 150a formed by a base station 110a with BS number "C10" (hereinafter referred to as origination MS 100a) makes a call connection to a mobile station 100j with MS number "P041" positioned in a cell 150f formed by a base station 110f with BS number "C31" (hereinafter referred to as destination MS 110j).

As shown by the signal sequence of FIG. 12, the origination MS 100a establishes a wireless link 601a with a BS 110a (hereinafter referred to as origination BS 110a) which accommodates the origination MS and thereafter transmits a call set up message 602a to the origination BS 110a. The origination BS 110a transmits a call set up message 622a to a BSC 120a with BSC number "Tr01" (hereinafter referred to as origination BSC 120a) which accommodates the origination BS 110a and transmits a call proceeding message 603a to the origination MS 100a. When receiving the call set up message 622a, the origination BSC 120a transmits a call proceeding message 623a to the origination BS 110a and starts an authentication processing program 450 by its local SCP 300.

As seen from the contents of the table 500a shown in FIG. 11A, the origination BSC 120a has no terminal information concerning the origination MS 100a with MS number "P020". Therefore, the origination BSC 120a broadcasts a request message* for authentication processing 681 (681a, 681c, 681c) to all other BSC's 120b, 120c and 120d connected by the exclusive network 127 (or signal lines 127ab, 127ac and 127ad) to the origination BSC 120a.

When receiving the request message for authentication processing, each of the other BSC's 120b, 120c and 120d starts an authentication processing program 450 by its local SCP 300.

In the shown example, the number analysis results in that the BSC 120b with BSC number "Tr02" is a home BSC for the origination BS 100a (hereinafter referred to as origination home BSC). The origination home BSC 120b acquires authentication data "648" of the origination MS from its data base on the basis of an authentication data address obtained from its content-addressable memory and transmits an authentication request message* 645a to the origination BSC 120a.

When receiving the authentication request message 645a, the origination BSC 120a transmits an authentication request message 625a to the origination BS 110a. The origination BS 110a transmits an authentication request message 605a to the origination MS 100a. The origination MS 100a enciphers authentication data preset in a memory by a random pattern given by the authentication request message and transmits an authentication response message 606a inclusive of the enciphered authentication data to the origination BS 110a. The enciphered authentication data is relayed by the origination BS 110a and the origination BSC 120a and is sent as an authentication response message 646a to the origination home BSC 120b.

The origination home BSC 120b compares the enciphered authentication data given by the authentication response message with enciphered authentication data stored on the BSC side. In the case where it is confirmed that correct authentication data is held by the origination MS, the origination home BSC 120b transmits an authentication completion message* 682a to the origination BSC 120a. Since the other BSC's 120c and 120d are not an origination home BSC, the transmission of a response message to the request message for authentication processing is not made to these BSC's.

When receiving the authentication completion message 682a, the origination BSC 120a starts a location information retrieval and transmission program 410.

First, the origination BSC 120a makes a number analysis for the MS number "P041" of the destination MS included in the call set up message 622a (step 400) and judges whether or not the BSC 120a itself is a home BSC of the destination MS (or destination home BSC) (step 411). In the shown example, location information of the destination MS 100j is not held by the BSC 120a or the BSC 120a is not the destination home BSC, as apparent from the contents of the table 500a shown in FIG. 11A. Therefore, the BSC 120a broadcasts a request message* for location information 683 to all the other BSC's 120b, 120c and 120d.

When receiving the request message for location information, each of the other BSC's 120b, 120c and 120d executes the location information retrieval and transmission program 410 by its local SCP. In the shown example, the BSC 120d is the destination home BSC in which location information concerning the destination MS 100j with MS number "P041" is held, as apparent from the contents of the table 500d shown in FIG. 11D. Accordingly, the destination home BSC 120d acquires the location information "MSW2-Tr03-C31" of the destination MS 100j from its data base and transmits a location information response message* 684a inclusive of the acquired location information to the origination BSC 120a. The other BSC's 120b and 120c, which are not the destination home BSC 120d, complete the program 410 without performing the operation of transmission of a response message.

When the location information of the destination MS 100j is obtained by the response message 684a, the origination BSC 120a transmits a call set up message 642a inclusive of the location information of the destination MS to a switching center 130a with SWC number "MSW1" which accommodates the origination BSC (hereinafter referred to as origination switching center 130a) (see FIG. 13).

The origination switching center 130a transmits an initial address message (IAM) 661 inclusive of the location information of the destination MS extracted from the call set up message to a switching center 130b with SWC number "MSW2" (hereinafter referred to as destination switching center 130b) and transmits a call proceeding message 643a to the origination BSC 120a.

On the basis of the location information of the destination MS extracted from the IAM 661, the destination switching center 130b transmits a call set up message 642b to the BSC 120c with BSC number "Tr03" which accommodates the destination BS 110f (hereinafter referred to as destination BSC 120c) and transmits an address complete message (ACM) 662 to the origination switching center 130a.

When receiving the call set up message 642b, the destination BSC 120c requests for paging of the destination MS to a plurality of BS's including the destination BS 110f with BS number "C31" which are under the control of the BSC 120c. Those BS's make paging 610 (610a, 610b) to a plurality of MS's (100i, 100j, 100k) which are positioned in their cell areas.

Only the destination MS 100j with MS number "P041" of the plurality of MS's subjected to paging discriminates the paging 610b destined for itself and establishes a wireless channel 601b with the destination BS 110f. Thereafter, the destination MS 100j performs a call set up processing (611a, 602b, 603b). At this time, an authentication processing is also required for the destination MS 100j as for the origination MS 100a.

The authentication processing is started by starting an authentication processing program 450 by a local SCP of the destination BSC 120c. The subsequent procedure (681d, 681e, 681f, 645b, 625b, 605b, 606b, 626b, 646b, 682b) is similar to the above-mentioned authentication procedure for the origination MS 100a.

When the authentication processing is completed (or an authentication completion message 682b is received), an alerting signal (607b, 627b, 647b, 647a, 627a, 607a) and a response signal (608b, 628b, 648b, 648a, 628a, 608a) are transmitted from the destination MS 100j to the origination MS 100a through the destination BS 110f, the destination BSC 120c, the destination switching center 130b, the origination switching center 130a, the origination BSC 120a and the origination BS 110a, as shown in FIG. 13. When the origination MS 100a transmits a response acknowledgement 609a to the origination BS 110a, the call set up between the MS's is completed. Thereby, communication 670 between the MS's 100a and 100j becomes possible.

CPM 663 and ANM 664 denote an alerting signal and a response signal communicated between the destination switching center 130b and the origination switching center 130a.

Figure 14:
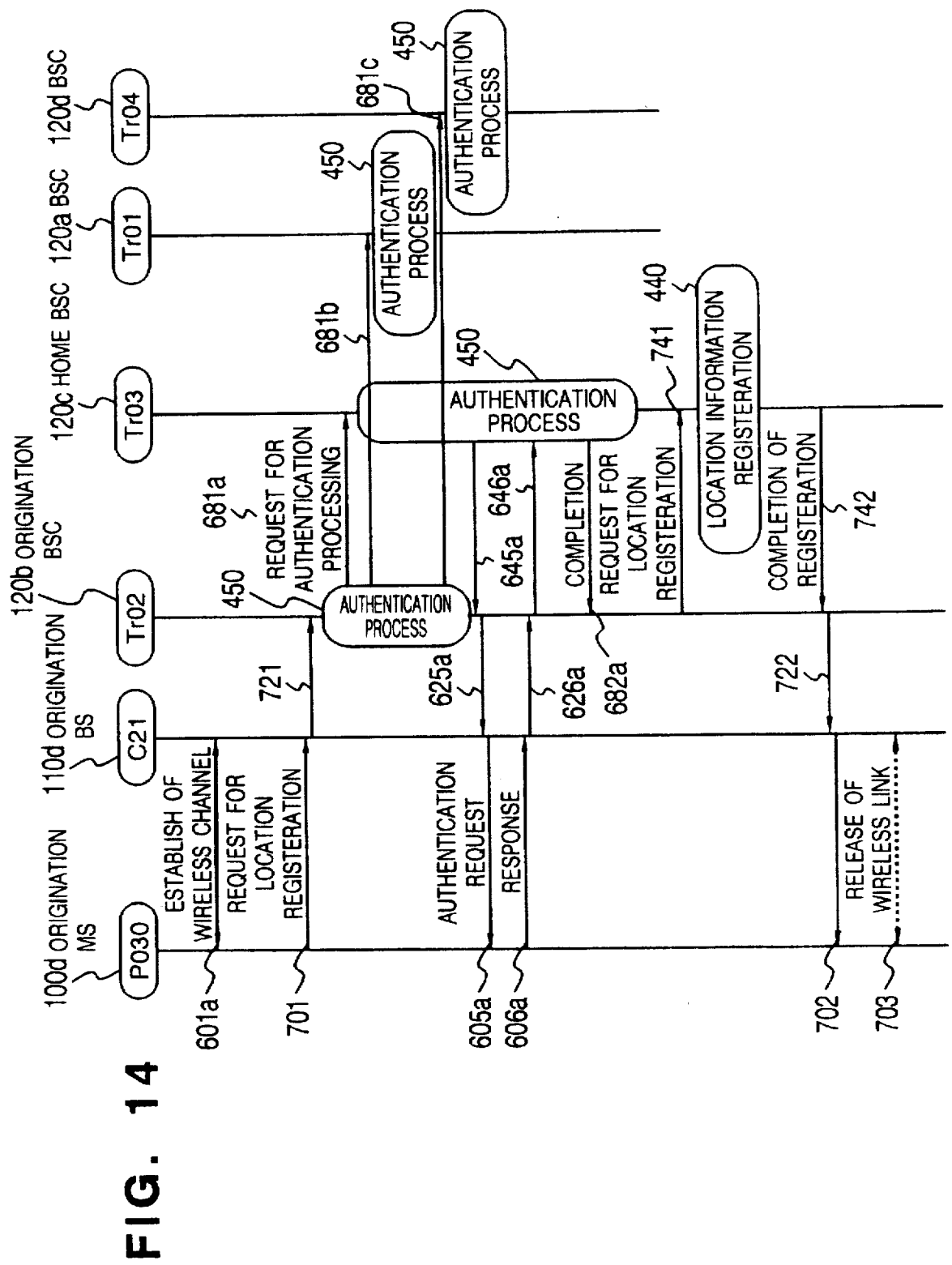
FIG. 14 is a sequence diagram showing an example of a location registration procedure in the mobile communication network shown in FIG. 10.

FIG. 14 shows one example of a location registering sequence in the home memory and broadcast type network, or more particularly, a signal sequence in the case where a mobile station 100d with MS number "P030" in FIG. 10 makes a location registration in a cell zone 150d with cell number "C21" included in a paging area or location registration area 140b with paging area number "LA02".

The origination MS 100d requesting for location registration establishes a wireless link channel 601a with a base station (or origination BS) 110d with BS number "C21" forming the cell 150d and thereafter transmits a request message* for location registration 701 inclusive of the MS number "P030" of the origination MS to the origination BS 110d.

When receiving the request message for location registration 701, the origination BS 110d transmits a request message for location registration 721 inclusive of the BS number "C21" and the MS number "P030" of the origination MS 100d to an origination BSC 120b with BSC number "Tr02".

When receiving the request message for location registration 721, the origination BSC 120b starts an authentication processing program 450. In the shown example, the origination BSC 120b is not a home BSC of the MS 100d. Therefore, the origination BSC 120b broadcasts a request message for authentication processing 681 (681a, 681b, 681c) to other BSC's (120a, 120c, 120d) in step 469 of the flow chart shown in FIG. 8.

Only the home BSC 120c with BSC number "Tr03" of the BSC's receiving the request message for authentication processing 681 performs the authentication data comparing process in steps 453 to 463 of the flow chart shown in FIG. 8. When an authentication completion message 682a including the BSC number "Tr01" of the home BSC 120c is received from the home BSC 120c, the origination BSC 120b transmits a request message* for location registration 741 inclusive of the MS number "P030" of the origination MS and the original BS address "MSW1-Tr02-C21" to the home BSC 120c.

The home BSC 120c starts a location information registering program 440 so that the BS address corresponding to the MS number "P030" of the origination MS is updated from "MSW1-Tr01-C11" to "MSW1-Tr02-C21" on the location information table in the data base. When the address updating process is completed, the home BSC 120c transmits a message* 742 indicative of the completion of location registration processing to the origination BSC 120b. Information of the completion of location registration is given by a message* 722 from the origination BSC 120b to the origination BS 110d and by a message* 702 from the origination BS 110d to the origination MS 100d. When receiving the location registration completion message 702, the origination MS 100d releases the wireless link (703).

Figure 15:
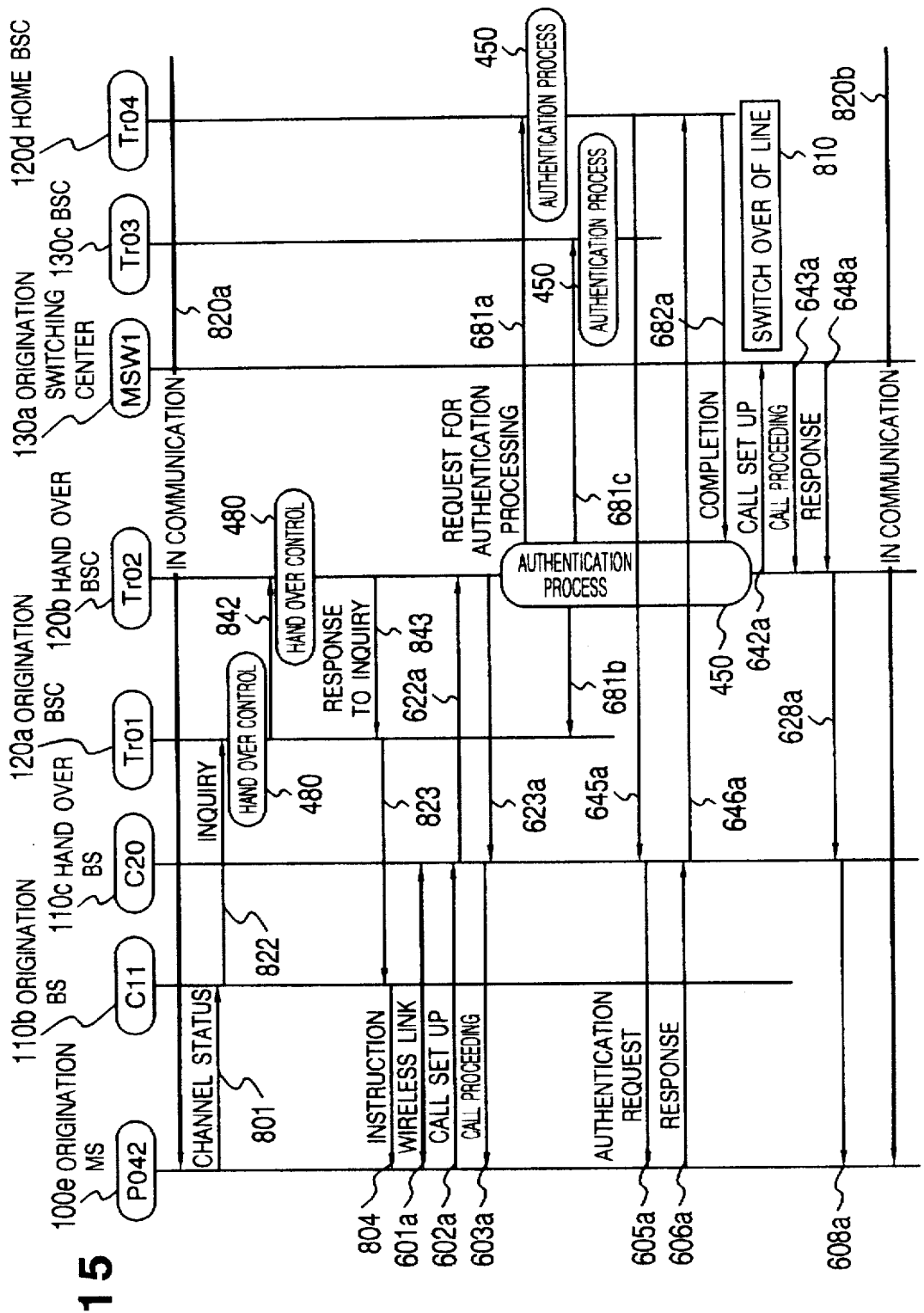
FIG. 15 is a sequence diagram showing an example of a hand over procedure in the mobile communication network shown in FIG. 10.

FIG. 15 shows one example of a hand over operation in the home memory and broadcast type network, or more particularly, a signal sequence in the case where a mobile station 100e with MS number "P042" shown in FIG. 10 is moved from a cell 150b with cell number "Ce11" to a cell 150c with cell number "Ce20" in course of communication with a mobile station 100j with MS number "P041".

In course of communication with the MS 100j, the MS 100e periodically detects the level of radio signal from an origination BSC 110b with BS number "C11" and BSC's 110a and 110c positioned therearound to report the result of detection as a radio channel status report message 801 to the origination BS 110b.

When detecting that the level of a received signal from the MS 100e changing with the movement thereof is lower than a predetermined threshold, the origination BS 110b makes a hand over in accordance with a procedure based on RCR STD-28. Namely, the MS number "P042" of the mobile station included in the radio channel status report message 801 received from the MS 100e is handed over to a BS 110c with BS number "C20" (hereinafter referred to as hand over BS 110c) which has the most satisfactory signal level among the other BS's.

When the origination BS 110b transmits a hand over inquiry message* 822 inclusive of the address "MSW1-Tr02-C20" of the hand over BS 110c to an origination BSC 120a in order to make the hand over, the origination BSC 120a transmits a hand over inquiry message 842 through the exclusive signal line 127ab to a BSC 120b with BSC number "Tr02" (hereinafter referred to as hand over BSC 120b) which accommodates the hand over BS 110c.

The hand over BSC 120b retrieves an idle slot and an idle channel of the hand over BS 110c and transmits a hand over response message* 843 indicative of the acceptance or non-acceptance of hand over to the origination BSC 120a. The origination BSC 120a informs the origination BS 110b of the received message as a hand over response message 823. If the response message 823 indicates the acceptance of hand over, the origination BS 110b gives a channel change-over instruction 804 to the MS 100e.

The MS 100e establishes a wireless link 601a with the hand over BS 110c in response to the channel change-over instruction and transmits a call set up message 602a to the hand over BS 110c. The subsequent call set up sequence (from call set up 622a to response 608a) performed by the hand over BS 110c, the new origination BSC 120b connected to the hand over BS 110c and the new origination switching center 130a connected to the new origination BSC 120b is similar to the call set up sequence between MS's mentioned referring to FIGS. 12 and 13.

The new origination switching center 130a connects a circuit having been formed between the destination MS 100j and the origination switching center 130a to a circuit newly formed between the origination MS 100e and the origination switching center 130a, thereby attaining the hand over.

Though omitted in FIG. 15, the origination switching center 130a completes the hand over sequence by disconnecting/releasing the old circuit before hand over between the origination BS 110b and the origination switching center 130a after the call has been set up newly.

In the case where the MS 100e moves from the cell 150c to a cell 150d adjacent thereto, the above sequence is repeated in such a manner that the BS 110c is taken as an origination BS and a BS 110d forming the cell 150d is taken as a new hand over BS.

Figure 16:
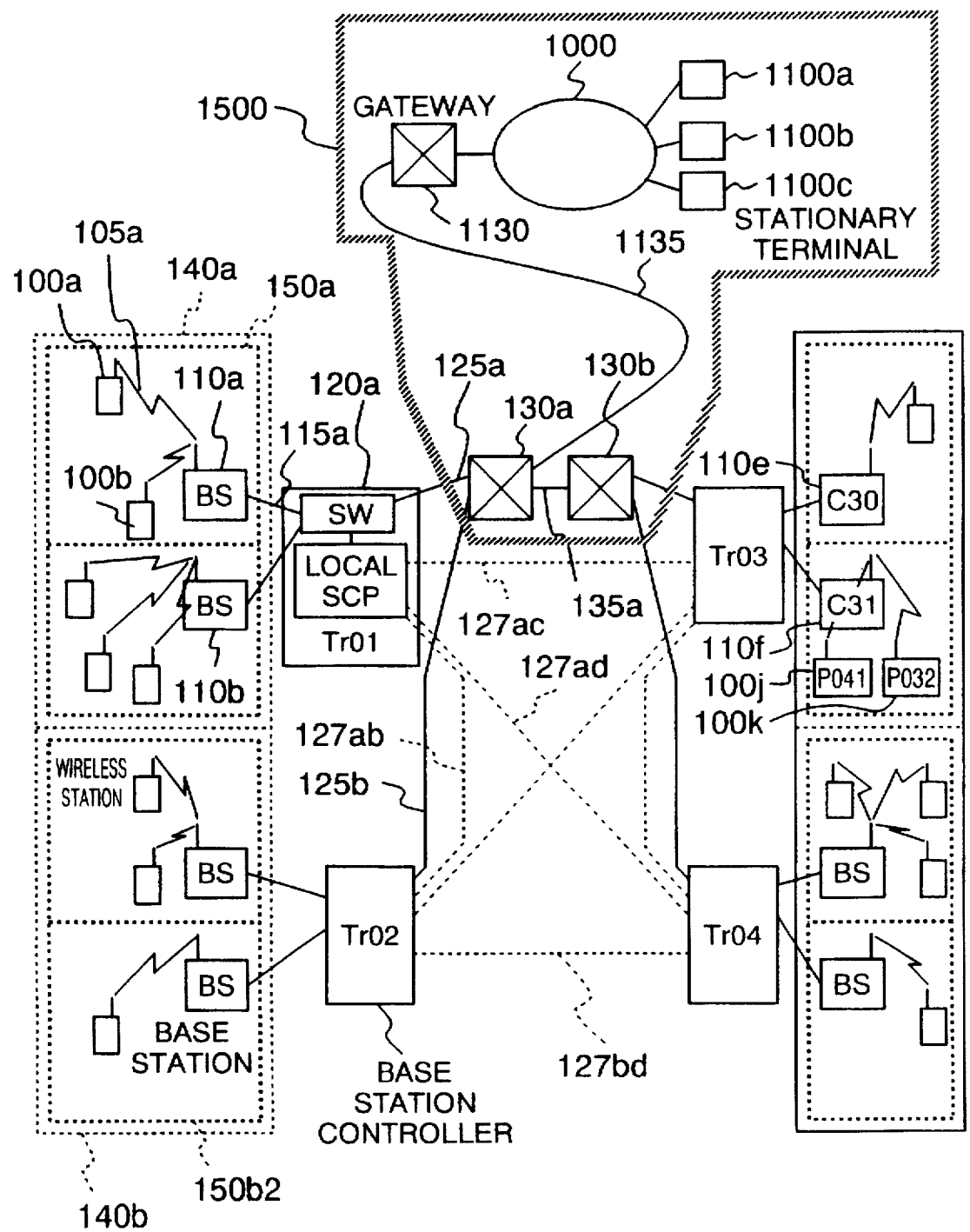
FIG. 16 is a diagram showing the construction of a second embodiment of the mobile communication network according to the present invention.

FIG. 16 shows a second embodiment of the home memory and broadcast type mobile communication network system according to the present invention.

In this network system, a wire network 1000 is connected through a gateway switch 1130 to the mobile communication network shown in FIG. 1 to enable communication between the mobile station 100 and a stationary terminal 1100 (1100a to 1100c). The wired network 1000, the gateway switch 1130 and the base station controller 130 form a network 1500 between switching centers.

Figure 17:
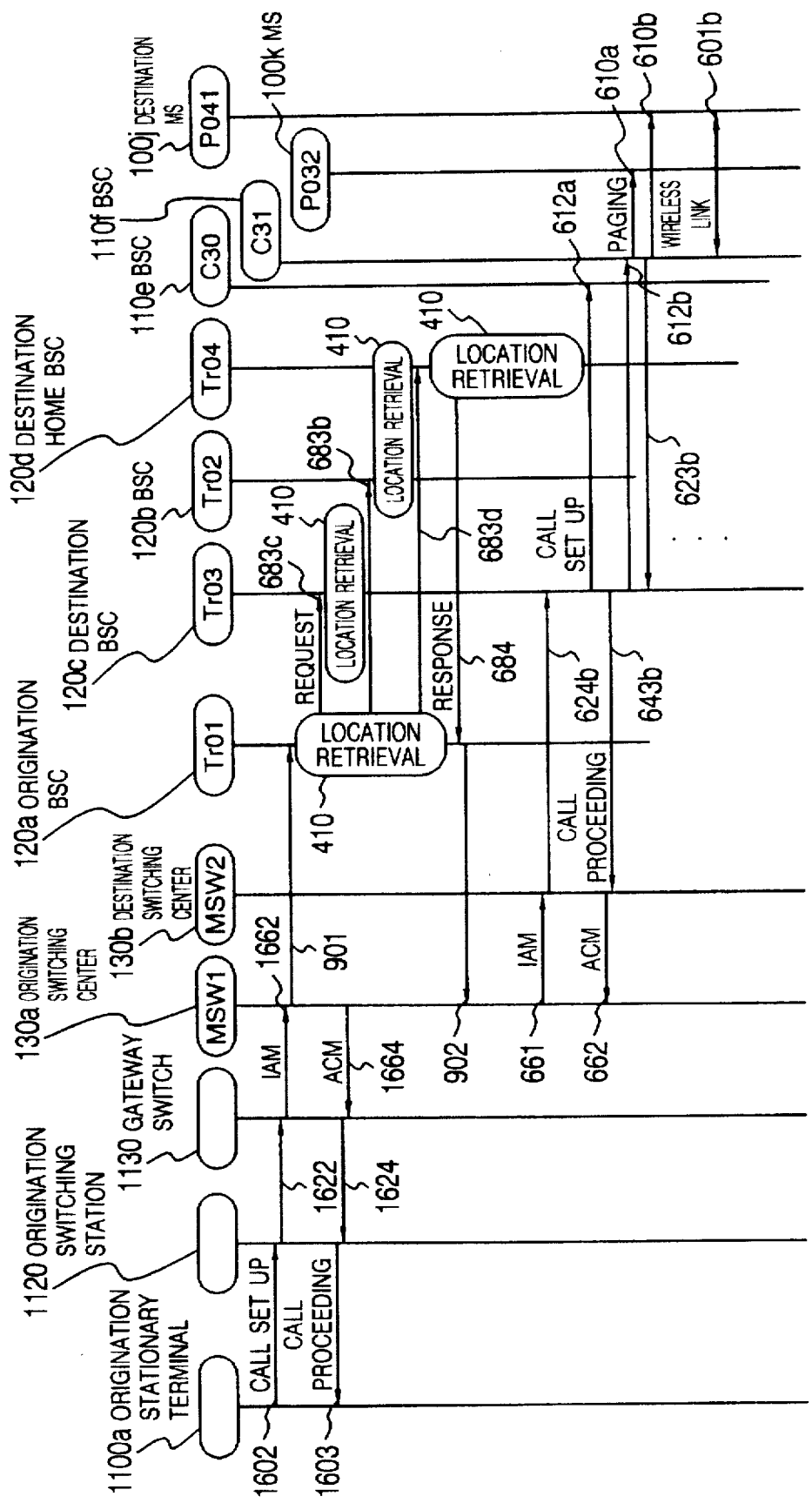
FIG. 17 is a sequence diagram showing a call set up procedure in the second embodiment of the present invention.

In the present embodiment, a processing for call set up between the stationary terminal and the mobile station is performed as follows. Assume that the mobile stations 100 (100a to 100o), the base stations 110 (110a to 110h), the base station controllers 120 (120a to 120d) and the switching centers 130 (130a, 130b) have the same ID numbers as those shown in FIG. 10. As one example, a procedure in the case of making a call connection from the stationary terminal 1100a to the mobile station 100j with MS number "P041" will be explained referring to a sequence shown in FIG. 17.

A call set up (1602 to 1664) from the stationary terminal 1100a to the (origination) switching center 130a through an origination switching station 1120 in the wired network 1000 and the gateway switch 1130 is performed in accordance with an ordinary call set up sequence in the wire network 1000.

When IAM 1662 including the MS number "P041" of the destination MS 100j is received from the gateway switch 1130, the origination switching center 130a with SWC number "MSW1" transmits a request message for location information 901 to a base station controller (origination BSC) 120a with BSC number "Tr01" in order to obtain location information of the destination MS.

When receiving the request message for location information 901, the origination BSC 120a starts a location information retrieval and transmission program 410 to broadcast a request message for location information 683 (683b, 683c, 683d) to each of the other BSC's (120b, 120c, 120d).

When a location information response message 684 including the location information of the destination MS 100j is received from the destination home BSC 120d with BSC number "Tr04", the origination BSC 120a transmits this message to the origination switching center 130a as a location information response message 902.

The subsequent call set up procedure performed by the origination switching center 130a, the destination switching center 130b, the destination BSC 120c, base stations 110e and 110f connected to the destination BSC 120c, and the destination MS 100j is similar to that in the first embodiment explained in conjunction with FIG. 13.

Next, explanation referring to FIGS. 18 to 25 will be made of a perfect broadcast type mobile communication network system as a third embodiment of the present invention in which a home base station controller for storing terminal location information is dynamically changed with the movement of a mobile station.

Figure 18:
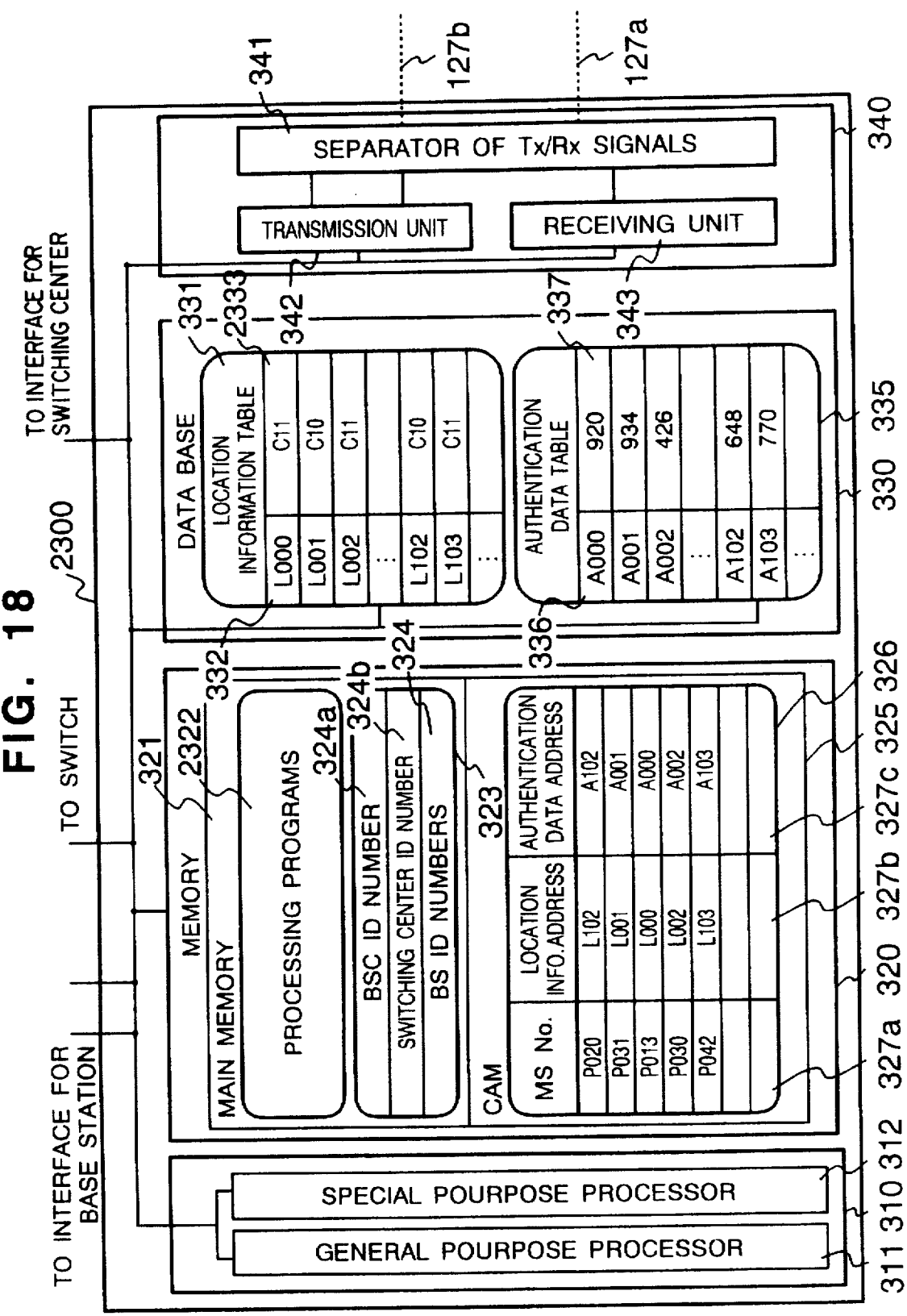
FIG. 18 is a block diagram of a local SCP showing a third embodiment of the present invention.

FIG. 18 shows the construction of a local SCP 300 of a base station controller 120 forming a mobile communication network in the present embodiment. As compared with the local SCP shown in FIG. 3, the local SCP shown in FIG. 18 is different therefrom in programs prepared in a main memory 321 and the contents of a location information table 331 prepared in a data base 330.

Figure 19:
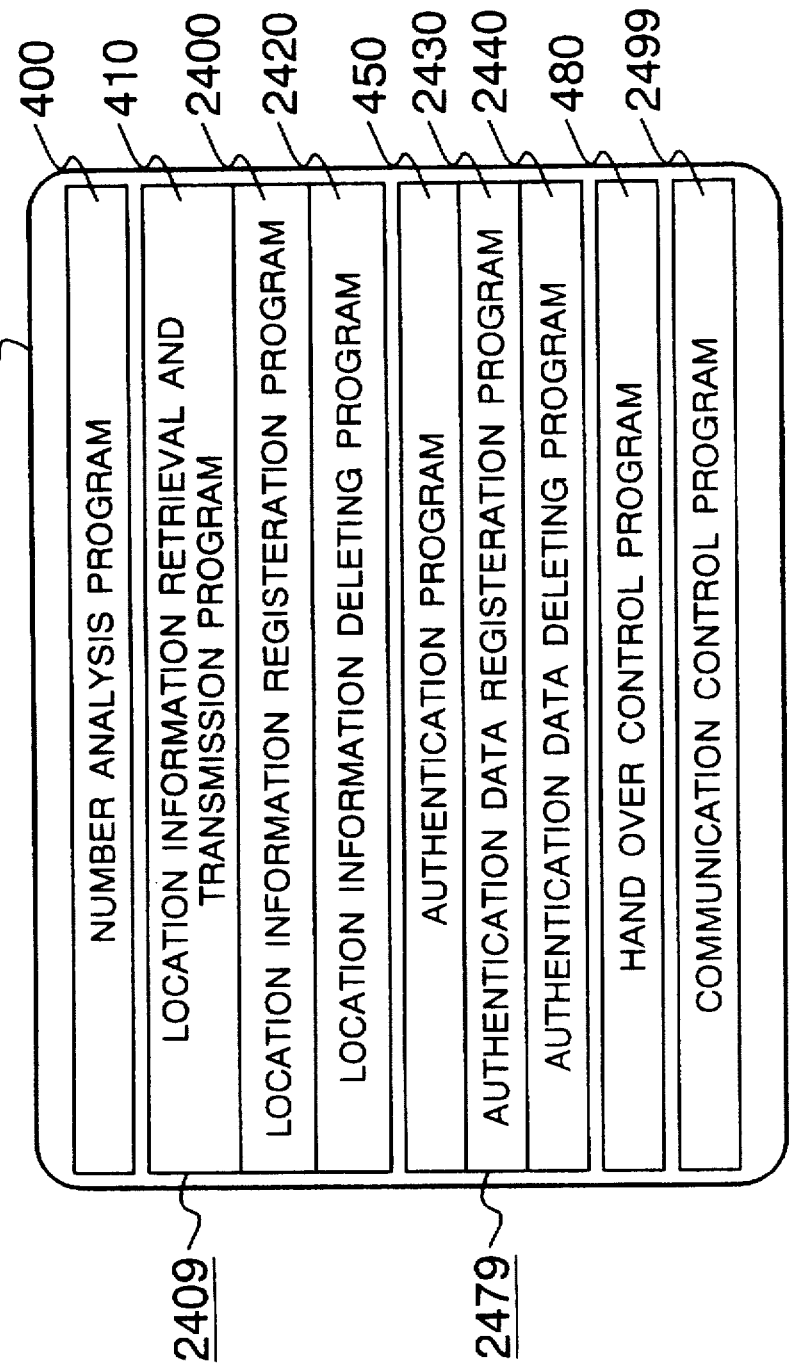
FIG. 19 is a diagram showing a plurality of programs prepared in a memory of the local SCP in the third embodiment of the present invention.

Processing programs 2322 are prepared in the main memory 321. The processing programs 2322 includes a number analysis program 400, a location information processing program 2409, a program 2479 concerning authentication data, a hand over control program 480, and a communication control program 2499 as shown in FIG. 19.

The location information processing program 2409 is composed of a location information registration program 2400, a location information deleting program 2420 by which the previous mobile station location information is deleted at the time of location registration, and a location information retrieval and transmission program 410.

The program 2479 concerning authentication data is composed of an authentication program 450, an authentication data registration program 2430 by which authentication data is registered into a destination base station controller at the destination of movement at the time of location registration, and an authentication data deleting program 2440 by which authentication data stored in a base station controller before movement is deleted at the time of location registration.

The flow charts of the number analysis program 400 and the location information retrieval and transmission program 410 are similar to those shown in FIGS. 5 and 6. The flow chart of the authentication program 450 is shown in FIG. 8.

Figure 20:
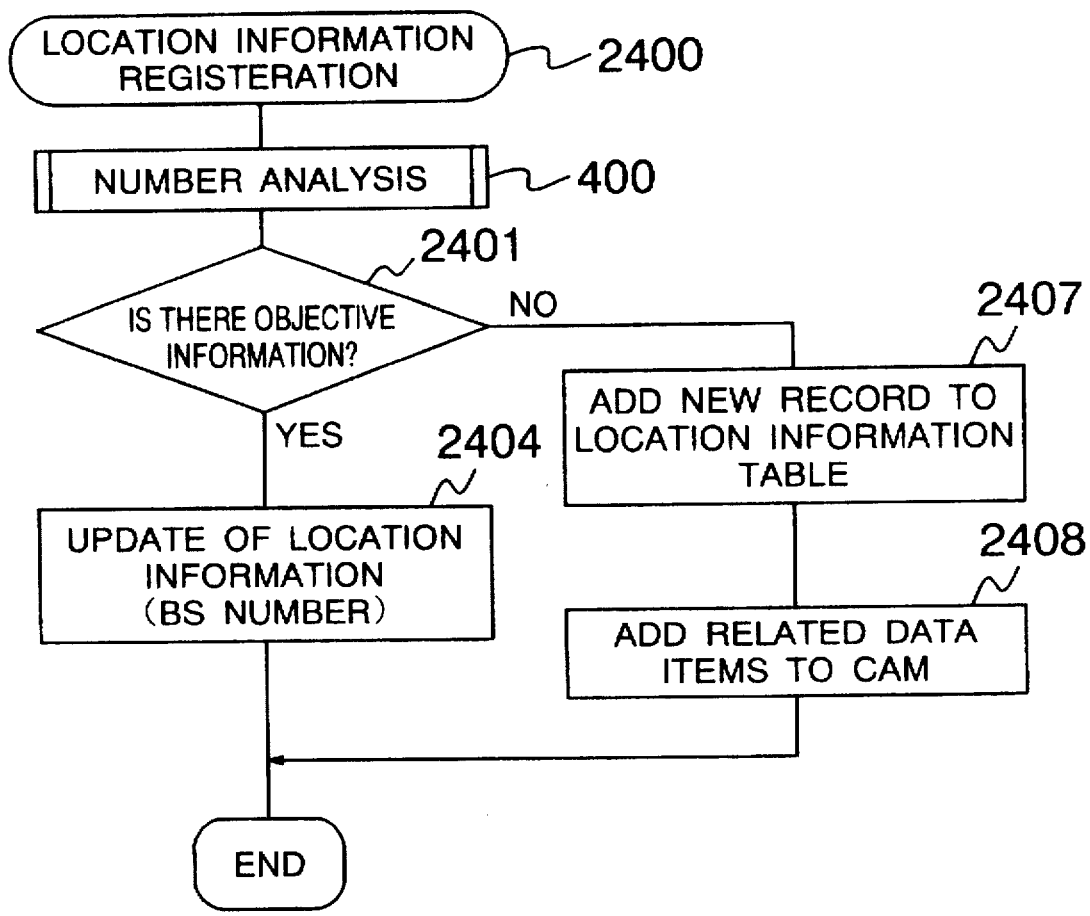
FIG. 20 shows a flow chart of a location information registering program in the third embodiment of the present invention.

FIG. 20 shows a flow chart of the location information registration program 2400.

A number analysis is made for an MS number designated by the request message for location registration (step 400) and the judgement is made as to whether or not the location information of a mobile station having the above MS number is stored in the data base (step 2401). In the case where the location information is stored in the data base, the access to the location information table 331 is made on the basis of a location information address 327b obtained from the content-addressable memory 325 so that the base station (BS) number 2333 in a location information record stored at the corresponding address position is updated to a new BS number designated by the request message for location registration (step 2404), thereby completing this routine.

On the other hand, in the case where the location information is not stored in the data base, a new location information record including the new BS number is added to the location information table 331 of the data base (step 2407). Next, the address 332 of the new location information record is registered into the content-addressable memory 325 in association with the above MS number (step 2408), thereby completing this routine.

In the present embodiment, each base station controller stores location information in its data base in regard to mobile stations positioned in the cells of base stations which are under the control of that base station controller. In order to reduce the memory area of the location information table 331, only a BS number is stored in each location information record. At the time of retrieval of location information, a BS number 2333 read from the location information table and a BSC number 324a and the SWC number 324b of a host switching center stored as fixed data in the main memory 321 are combined to generate a base station address 333 shown in the location information table of FIG. 3.

Figure 21:
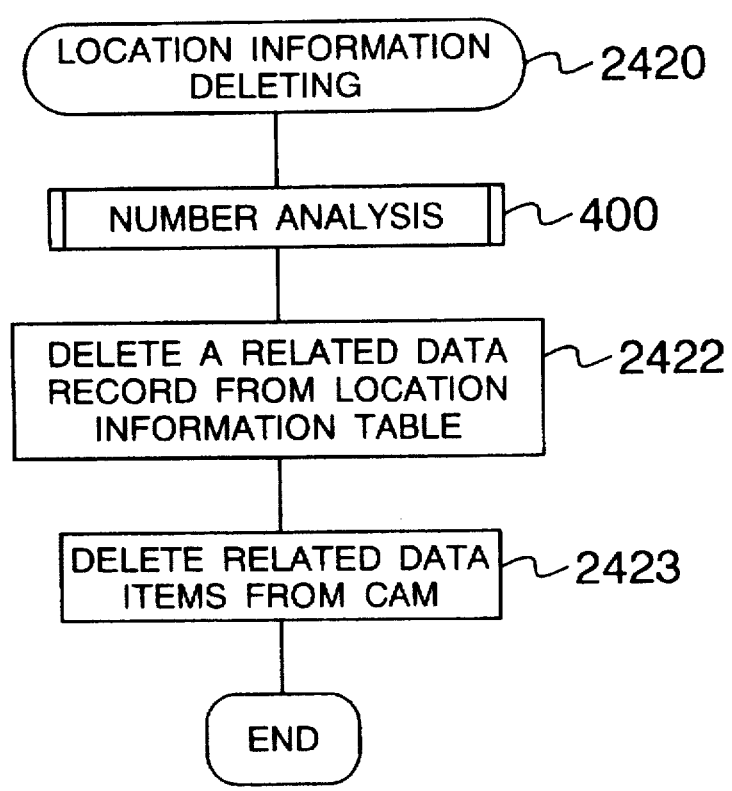
FIG. 21 shows a flow chart of a location information deleting program in the third embodiment of the present invention.

FIG. 21 shows a flow chart of the location information deleting program 2420.

When a location information delete instruction message is received, a number analysis is made for an MS number designated by that message (step 400) and the access to the location information table 331 of the data base is made on the basis of a location information memory address 327b obtained from the content-addressable memory 325 to delete a location information record stored at that address position (step 2422). Next, a terminal information record corresponding to the location information record is deleted from the content-addressable memory 325 (step 2423), thereby completing this routine.

In the case where an authentication data memory address is stored in the terminal information record on the content-addressable memory made the object of deletion, only the location information address is erased leaving the terminal information record in the content-addressable memory.

Figure 22:
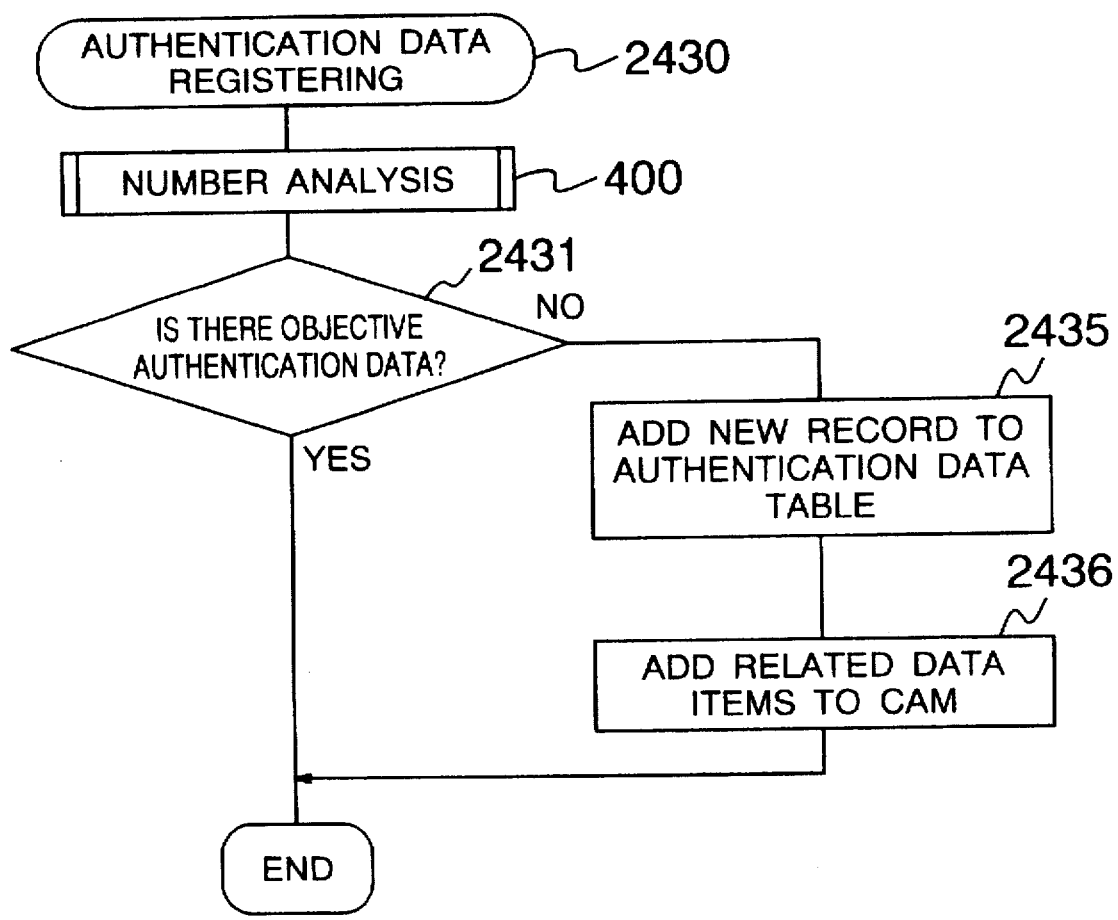
FIG. 22 shows a flow chart of an authentication data registration program in the third embodiment of the present invention.

FIG. 22 shows a flow chart of the authentication data registration program 2430.

When an authentication data response message is received, a number analysis is made for an MS number designated by that message (step 400) and the judgement of whether or not authentication data of the designated mobile station has already been stored in the authentication data table 335 of the data base 330 is made on the basis of the result of access to the content-addressable memory (step 2431). In the case where the authentication data has already been stored in the authentication data table 335, this routine is completed. In the case where the authentication data has not yet been stored in the authentication data table 335, a new record including the authentication data of the mobile station given by the above-mentioned response message is registered into the authentication data table 335 (step 2435). Next, the address of the authentication data record is registered into the content-addressable memory 325 in association with the above MS number (step 2436), thereby completing this routine.

Figure 23:
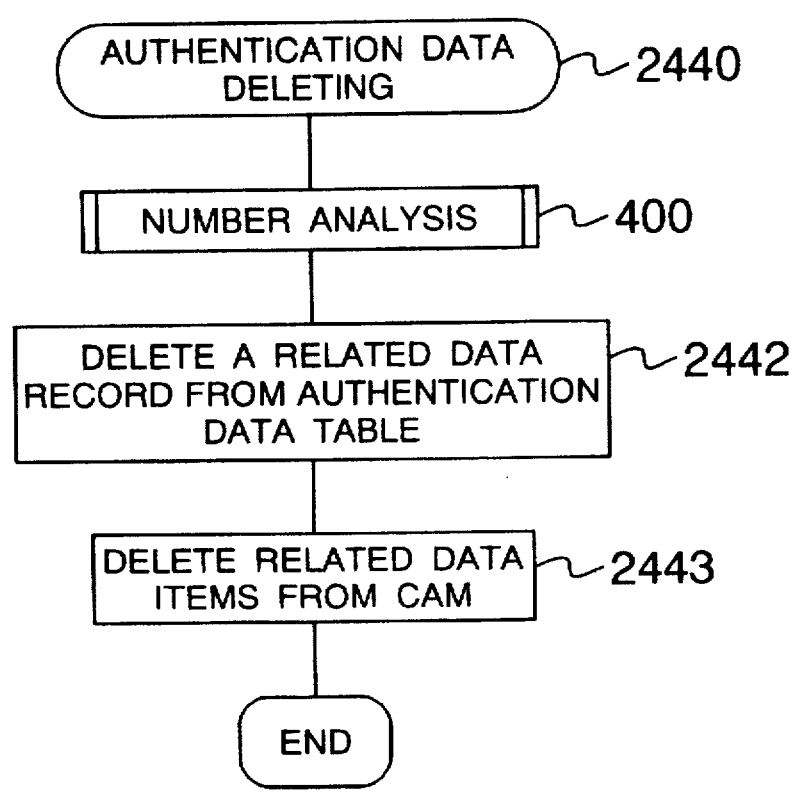
FIG. 23 shows a flow chart of an authentication data deleting program in the third embodiment of the present invention.

FIG. 23 shows a flow chart of the authentication data deleting program 2440.

When an authentication data delete instruction message is received, a number analysis is made for the ID number of a mobile station designated by that message (step 400) and the access to the authentication data table 335 of the data base 330 is made on the basis of an authentication data address 327c obtained from the content-addressable memory 325 to delete an authentication data record stored at that address position (step 2442). Thereafter, a terminal information record corresponding to the above MS number is deleted from the content-addressable memory 325 (step 2443), thereby completing this routine.

In the case where a location information address is held in the terminal information record made the object of deletion, only the authentication data address 327b is erased leaving the terminal information record.

Figure 24:
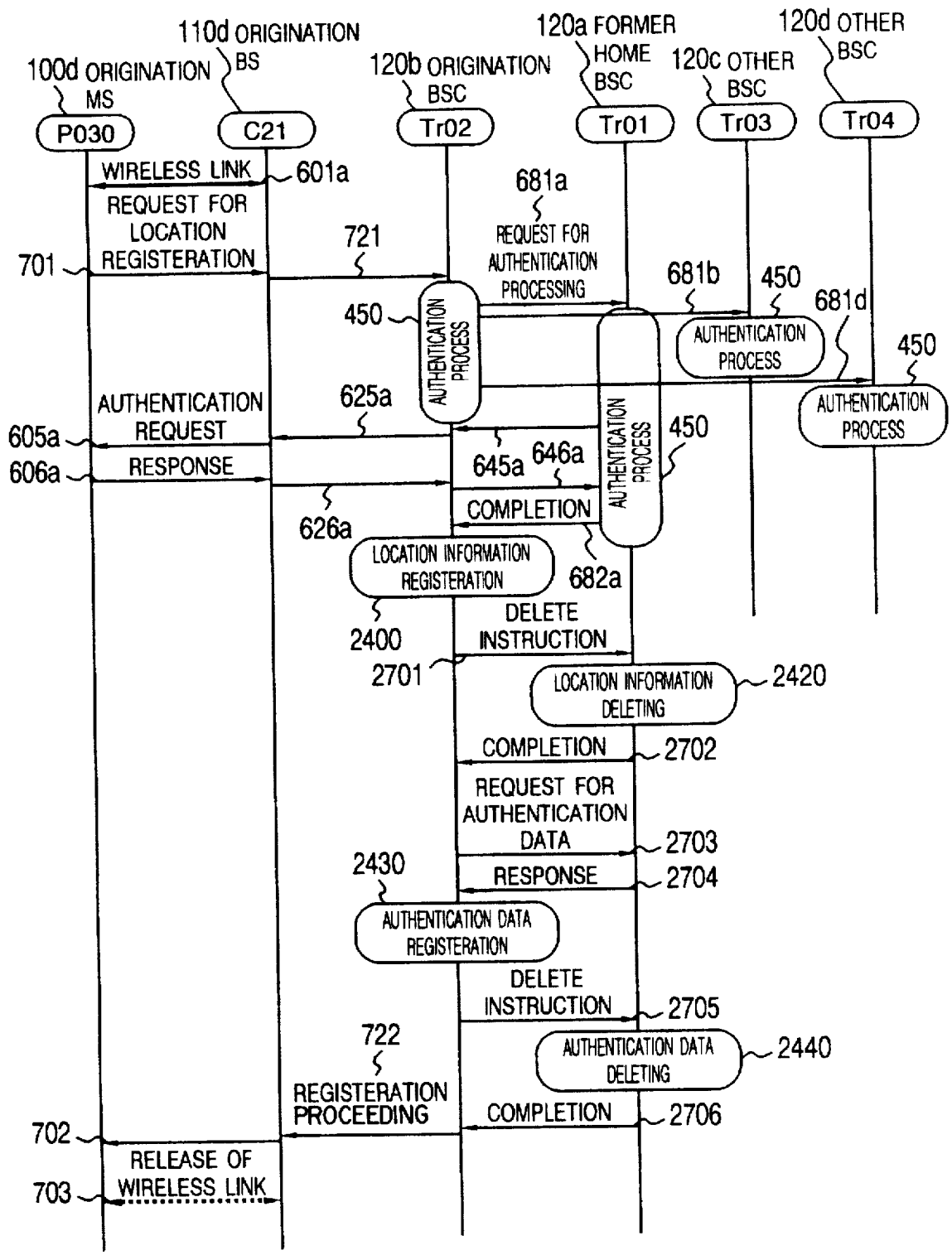
FIG. 24 is a sequence diagram showing an example of a location registration procedure in the third embodiment of the present invention.

FIG. 24 shows an example of a location registering sequence in the this embodiment of the present invention.

Now consider the case where in the network system shown in FIG. 10, a mobile station 100d with MS number "P030" having been subjected to the control of location information by a base station controller 120a is subjected to location registration in a cell 150d formed by a base station 110d which is at the destination of the mobile station.

In this case, the MS 100d establishes a wireless link channel 601a with the BS 110d and thereafter transmits a request message for location registration 701 inclusive of the MS number "P030" of the MS 100d. When receiving the request message for location registration 701, the BS 110d generates a request message for location registration 721 including the BS number "C21" of the BS 110d and the MS number "P030" of the MS 100d and transmits it to a BSC 120b (hereinafter referred to as origination BSC 120b) with BSC number "Tr02" which is connected to the BS 110d.

When receiving the message 721, the origination BSC 120b starts an authentication program 450 explained in conjunction with FIG. 8. In the shown example, the origination BSC 120b does not possess the location information of the MS 100d in its data base. Therefore, The origination BSC 120b broadcasts a request message for authentication processing 681 (681a, 681b, 681d) to the other BSC's 120a, 120c and 120d in step 469 of the flow chart shown in FIG. 8.

Only the former home BSC 120a with BSC number "Tr01" among the BSC's receiving the request message for authentication processing performs steps 453 to 463 shown in FIG. 8. Thereby, an authentication request 605a (645a, 625a) is transmitted to the MS 100d through the BSC 120b and the BS 110d and an authentication response 606a (626a, 646a) including enciphered authentication data from the MS 100d is transferred to the BSC 120a. If the enciphered authentication data has no error, an authentication completion message 682a is transmitted from the BSC 120a to the origination BSC 120b.

When receiving the authentication completion message 682a, the origination BSC 120b starts a location information registration program 2400 explained in conjunction with FIG. 20. In the shown example, a location information record of the MS 100d is newly added to the location information table 331 of the data base.

Thereafter, the origination BSC 120b transmits a location information delete instruction message* 2701 inclusive of the MS number "P030" to the former home BSC 120a which is known by the authentication completion message 682a. Thereby, a location information deleting program 2420 is executed in the BSC 120a so that the location information record of the MS 100d is deleted from the location information table 331 of the data base and a location information deletion completion message* 2702 is transmitted to the BSC 120b.

When receiving the completion message 2702, the origination BSC 120b transmits a request message* for authentication data 2703 inclusive of the MS number "P030" of the MS 100d to the BSC 120a. Thereby, an authentication data response message* 2704 including the authentication data of the MS 100d is transmitted from the BSC 120a to the origination BSC 120b.

When receiving the response message 2704, the origination BSC 120b starts an authentication data registration program 2430 to register the authentication data of the MS 100d into the authentication data table 335 of the data base 330 and thereafter transmits an authentication data delete instruction message* 2705 inclusive of the MS number "P030" to the BSC 120a.

When receiving the authentication data delete instruction message 2705, the BSC 120a starts an authentication data deleting program 2440 to delete the authentication data of the MS 100d from the authentication data table 335 and to delete data items concerning the MS 100d from the content-addressable memory and thereafter transmits an authentication data deletion completion message* 2706 to the BSC 120b.

When receiving the completion message 2706, the origination BSC 120b transmits a location registration completion message 722 to the origination BS 110d. Information of the completion of location registration is given from the origination BS 110d to the origination MS 100d by a message 702. When the completion message is received, the MS 100d releases the wireless link channel (703), thereby completing the location registering sequence.

Figure 25:
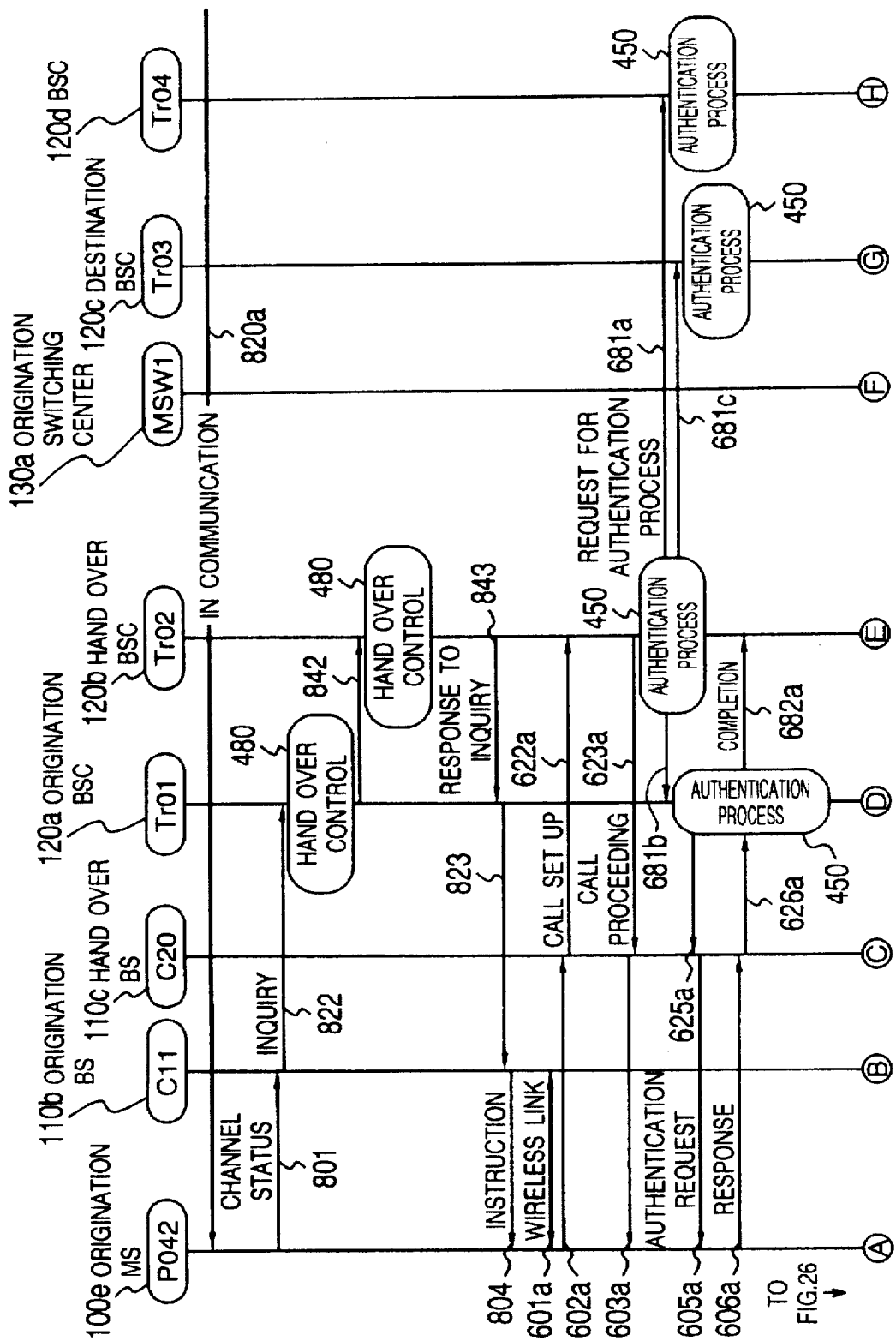
FIG. 25 is a sequence diagram showing a first portion of a hand over procedure in the third embodiment of the present invention.

FIGS. 25 and 26 show a hand over sequence in the case where an origination MS 100e with MS number "P042" in FIG. 10 moves from a cell 150b to 150c in course of communication with a destination MS 100j with MS number "P041".

A sequence from the transmission of a radio channel status report message 801 by the origination MS 100e to the issuance of a request message for authentication processing 681 (681a to 681c) by a hand over BSC 120b is similar to the sequence in the first embodiment shown in FIG. 15.

In the present embodiment, authentication data of the MS 100e is possessed by an origination BSC 120a. Therefore, the origination BSC 120a responds to the request for authentication processing 681b to transmit an authentication request message 625a to a hand over BS 110c. When receiving an authentication response message 626a from the hand over BS 110c, the origination BSC 120a checks enciphered authentication data and transmits an authentication completion message 682a to the hand over BSC 120b.

When the authentication completion message 682a is received, the hand over BSC 120b performs a location information registration processing 2400 for the MS 100e. Thereafter, the hand over BSC 120b successively issues a location information delete instruction message 2701, a request message for authentication data 2703 and an authentication data delete instruction message 2705 to the BSC 120a, as is done by the BSC 120b to the BSC 120a in FIG. 24. Thereby, the terminal information of the MS 100e is transferred from the BSC 120a (which was a home BSC of the MS 100e up to the present) to the hand over BSC 120b. As a result, the switch-over of a home BSC attendant upon the movement of an MS is realized.

In the third embodiment mentioned above, a home base station controller is dynamically changed by properly transferring the location information and authentication data of a mobile station through the exclusive line 127 to a base station controller which is at the destination of the mobile station. According to this mobile communication network, a home base station controller possessing the terminal information of an origination mobile station serves as an origination base station controller in the case where a call is to be set up between one mobile station and another mobile station. For example, therefore, the procedure in FIG. 12 from the request for authentication processing 681a to the report of authentication completion 682a performed between the origination BSC 120a and the origination home BSC 120b is omitted and the origination BSC 120a can issue the authentication request 625a by itself to the origination BS 110a. Also, the destination BSC 120c possessing the terminal information of the destination MS 100j (which is under control of the BSC 120c) can complete the authentication processing by itself without issuing a request for authentication processing to another BSC.

It can be understood from the foregoing embodiments that since mobile station or terminal information is stored in a decentralized manner by a plurality of base station controllers forming a mobile communication network, the present invention can solve the problems in the centralized control of terminal information which includes a scarcity of memory capacity associated with the increase in number of subscribers and the concentration of request messages for terminal information from individual base stations to a data base. Also, with the use of a construction in which the plurality of base station controllers are connected by an exclusive network and terminal information and control messages are communicated through the exclusive network, each base station controller can acquire control information quickly without giving bad influence on the traffic concerning call processing and IN service. Further, in the case where the inquiry of terminal information by a broadcast message is made between base station controllers by use of the exclusive network, each base station controller needs no routing table and hence a flexible dial number scheme having no limitation base on the routing can be employed for mobile station ID numbers and subscriber numbers.

We claim:

1. A mobile communication network comprising:

a plurality of base stations each of which communicates with a plurality of mobile stations through wireless channels;

a plurality of control stations, each of said control stations having a data base for storing terminal information including location data of each mobile station in a group of mobile stations and serving as a home control station for said group of mobile stations; and an exclusive network for interconnecting said plurality of control stations with each other, wherein each of said control stations includes:

means for making, when terminal information for one mobile station is required, the judgement of whether or not the required terminal information is stored in said data base and for broadcasting, in the case where the required terminal information is not stored in said data base, a request message for the required terminal information to a plurality of other control stations through said exclusive network, means for receiving through said exclusive network a response message which one of the other control stations serving as a home control station of said one mobile station transmits in response to said request message, means for transmitting, when a request message for terminal information concerning one mobile station is received from any one of other control stations through said exclusive network, a response message inclusive of the requested terminal information to the requesting control station through said exclusive network if the requested terminal information is stored in said data base, and a content-addressable memory for storing identification numbers of said group of mobile stations and memory addresses of terminal information thereof in said data base in association with each other and wherein each of said control stations makes, when terminal information for one mobile station is required, the reference to said content-addressable memory to judge whether or not the required terminal information is stored in said data base.

2. A mobile communication network according to claim 1, wherein each of said control stations has a first processor for performing the operation of call control and a second processor for performing the operation of analysis of the identification number of a mobile station made the object of call control, said second processor making said reference to said content-addressable memory to judge whether or not the required terminal information is stored in said data base.

3. A mobile communication network according to claim 1, wherein each of said control stations has a first processor for performing the operation of call control and a second processor for performing the operation of analysis of the identification number of a mobile station made the object of call control, said second processor including means for broadcasting said request message for the required terminal information and means for transmitting said response message inclusive of the requested terminal information to the requesting control station.

4. A mobile communication network according to claim 1, wherein said control station is coupled to another network having a plurality of stationary terminals connected thereto and makes a call connection between one of said plurality of mobile stations and one of said plurality of stationary terminals.

5. A mobile communication network comprising:

at least one switching center;

a plurality of base stations each of which communicates with a plurality of mobile stations through wireless channels;

a plurality of control stations each provided for connecting said switching center and a group of base stations which are under the control of that control station, each of said control stations having a data base for storing terminal information including location data and authentication data of each mobile station in a group of mobile stations and serving as a home control station for said group of mobile stations; and an exclusive network for interconnecting said plurality of control stations with each other, and wherein each of said control stations includes means for making, when authentication data for one mobile station is required, the judgement of whether or not the required authentication data is stored in said data base and for broadcasting, in the case where the required authentication data is not stored in said data base, a request message for authentication processing concerning said one mobile station to a plurality of other control stations through said exclusive network, means for receiving through said exclusive network a response message indicative of the result of authentication of said one mobile station which one of the other control stations serving as a home control station of said one mobile station transmits, and means for using, when a request message for authentication processing concerning a specified mobile station is received from any one of other control stations through said exclusive network and if authentication data of said specified mobile station is stored in said data base, said authentication data to perform a predetermined procedure for terminal authentication between that control station and said specified mobile station and transmitting a response message indicative of the result of authentication to the requesting control station through said exclusive network.

6. A mobile communication network according to claim 5, wherein each of said control stations further includes means for transmitting, in the case where said response message inclusive of the result of authentication received from said one other control station indicates the validity of said one mobile station, a request message for location registration inclusive of data of the present location of said one mobile station to said one other control station through said exclusive network, and means for replacing, when a request message for location registration including data of the present location of one mobile station is received from any one of other control stations through said exclusive network, the location data of said mobile station stored in said data base by location data designated by the received request message.

7. A mobile communication network according to claim 5, wherein each of said control stations has a content-addressable memory for storing identification numbers of said group of mobile stations and memory addresses of terminal information thereof in said data base in association with each other and makes, when terminal information for one mobile station is required, the reference to said content-addressable memory to judge whether or not the required terminal information is stored in said data base.

8. A mobile communication network according to claim 7, wherein each of said control stations has a first processor for performing the operation of call control and a second processor for performing the operation of analysis of the identification number of a mobile station made the object of call control, said second processor making access to said content-addressable memory to judge whether or not the required terminal information is stored in said data base.

9. A mobile communication network according to claim 5, wherein each of said control stations has a first processor for performing the operation of call control and a second processor for performing the operation of analysis of the identification number of a mobile station made the object of call control, said second processor including means for broadcasting said request message for authentication processing and means for transmitting said response message to the requesting control station.

10. A mobile communication network according to claim 5, wherein said control station is coupled to another network having a plurality of stationary terminals connected thereto and makes a call connection between one of said plurality of mobile stations and one of said plurality of stationary terminals.

11. A mobile communication network comprising:

at least one switching center;

a plurality of base stations each of which communicates with a plurality of mobile stations through wireless channels;

a plurality of control stations each provided for connecting said switching center and a group of base stations which are under the control of that control station, each of said control stations having a data base for storing terminal information including location data of each of mobile stations positioned in a cell formed by each of base stations which are under the control of that control station; and an exclusive network for interconnecting said plurality of control stations with each other, and wherein each of said control stations includes means for making, when terminal information for one mobile station is required, the judgement of whether or not the required terminal information is stored in said data base and for broadcasting, in the case where the required terminal information is not stored in said data base, a request message for transmission the required terminal information or for execution of a predetermined communication procedure based on the requested terminal information to a plurality of other control stations through said exclusive network, means for storing, when a response message transmitted from one of the other control stations serving as a home control station of said one mobile station is received from said exclusive network, terminal information indicated by said response message into said data base and requesting the source control station of said response message to delete the terminal information, means for performing, when a request message for transmission of terminal information concerning one mobile station or execution of a communication procedure thereof broadcasted by any one of the other control stations is received from said exclusive network and if the requested terminal information is stored in said data base, an operation corresponding to said request message, and means for deleting, when a request message for deletion of terminal information concerning a specified mobile station transmitted by any one of the other control stations is received from said exclusive network, the corresponding terminal information stored in said data base.

12. A mobile communication network according to claim 11, wherein the terminal information stored in the data base of each of said control stations includes authentication data of each mobile station, and each of said control stations broadcasts, when a request for location registration or call set up for a specified mobile station is received from a base station which is under the control of that control station, a request message for authentication processing of said specified mobile station to a plurality of other control stations through said exclusive network by use of said request message broadcasting means.

13. A control method in a mobile communication network including at least one switching center, a plurality of base stations each of which communicates with a plurality of mobile stations through wireless channels, a plurality of control stations each provided for connecting a group of base stations to said switching center, each of said control stations having a data base for storing terminal information including location data of a plurality of mobile stations and serving as a home control station for a group of mobile stations which are under the control of that control station, and an exclusive network for interconnecting said plurality of control stations with each other, the method comprising the steps of:

judging when a call set up signal including the identification number of a destination mobile station is received by an origination control station from an origination mobile station, by said origination control station whether or not location data of said destination mobile station is stored in the data base of said origination control station, and broadcasting by said origination control station, in the case where the location data is not stored in said data base, a request message for terminal information inclusive of the identification number of said destination mobile station to a plurality of other control stations through said exclusive network;

transmitting by a home control station possessing the location data of said destination mobile station requested by said request message, a response message inclusive of the location data to said origination control station through said exclusive network; and transmitting by said origination control station a call set up signal inclusive of the location data of said destination mobile station indicated by said data base or said response message to the switching center connected to said origination control station.

14. A control method in a mobile communication network according to claim 13, wherein the data base of each of said control stations stores therein terminal information including authentication data of each of mobile stations which are under the control of that control station, in a case where the authentication data of said origination mobile station is not stored in the data base of an origination control station which receives a call set up signal from an origination mobile station, said origination control station broadcasts a request message for authentication processing inclusive of the identification number of said origination mobile station to a plurality of other control stations through said exclusive network, and when said request message for authentication processing is received by one of the other control stations which serves as a home control station for said origination mobile station, said one control station performs a predetermined authentication processing by use of the authentication data of said origination mobile station and transmits a response message indicative of the result of authentication processing to said origination control station through said exclusive network.

15. A control method in a mobile communication network including a first network having a plurality of stationary terminals connected thereto, a second network having at least one switching center coupled to said first network, a plurality of base stations each of which communicates with a plurality of mobile stations through wireless channels, a plurality of control stations each provided for connecting a group of base stations to said switching center, each of said control stations having a data base for storing terminal information including location data of a plurality of mobile stations and serving as a home control station for a group of mobile stations which are under the control that control station, and an exclusive network for interconnecting said plurality of control stations with each other, the method comprising the steps of:

transmitting when a call set up signal including the identification number of a destination mobile station as one of said plurality of mobile stations is received by said switching center from an origination stationary terminal which is one of said plurality of stationary terminals, said call set up signal from said switching center transmits to an origination control station as one of said plurality of control stations;

receiving said call set up signal by said origination control station to judge whether or not location data of said destination mobile station is stored in the data base of said origination control station, and broadcasting from said origination control station a request message for terminal information inclusive of the identification number of said destination mobile station to a plurality of other control stations through said exclusive network in the case where the location data is not stored in said data base;

transmitting by a home control station which possesses the location data of said destination mobile station requested by said request message, a response message inclusive of the location data to said origination control station through said exclusive network;

transmitting by said origination control station a call set up signal inclusive of the location data of said destination mobile station indicated by said data base or said response message to said switching center; and transmitting by said switching center a call set up signal to a destination control station determined by the location data of said destination mobile station included in the call set up signal received from said origination control station.

16. A control method in a mobile communication network according to claim 15, wherein said second network includes a plurality of switching centers, a first one of said plurality of switching centers being connected to said first network, said origination control station transmits said call set up signal inclusive of the location data of said destination mobile station to said first switching center, and said first switching center transmits a call set up signal to a destination control station determined by the location data of said destination mobile station included in the call set up signal received from said origination control station or another switching center connected to said destination control station.

17. A control method in a mobile communication network according to claim 15, wherein the terminal information stored in the data base of each of said control stations includes authentication data of a group of mobile stations which are under the control of that control station, and the method further comprises the steps of:

judging by said origination control station when said call set up signal is received by said origination control station, whether or not the authentication data of said destination mobile station is stored in the data base of said origination control station, and broadcasting from said origination control station a request message for authentication processing inclusive of the identification number of said destination mobile station to a plurality of other control stations through said exclusive network in the case where the authentication data is not stored in said data base; and performing a predetermined authentication procedure by that home control station of said plurality of other control stations receiving said request message for authentication processing which stores authentication data of said destination mobile station therein, using the authentication data between said home control station and said destination mobile station and informs said origination control station of the result of authentication.

18. A location registration control method in a mobile communication network including at least one switching center, a plurality of base stations each of which communicates with a plurality of mobile stations through wireless channels, a plurality of control stations each provided for connecting a group of base stations to said switching center, each of said control stations having a data base for storing terminal information including location data of a plurality of mobile stations and serving as a home control station for a group of mobile stations which are under the control that control station, and an exclusive network for interconnecting said plurality of control stations with each other, the method comprising the steps of:

transmitting a location registration signal including the identification number of said one base station and the identification number of a specified mobile station to be subjected to location registration, from one base station to an origination control station connected to said one base station;

broadcasting from said origination control station when said location registration signal is received by said origination control station, a request message for authentication processing for said specified mobile station to a plurality of other control stations through said exclusive network;

performing by a specified control station as a home control station for said specified mobile station in response to the reception of said request message, a predetermined authentication procedure between said specified control station and said specified mobile station and thereafter broadcasting a response message including information indicative of the result of authentication and the address of said specified control station to said origination control station through said exclusive network;

transmitting from said origination control station, in the case where the result of authentication included in said response message indicates the approval of said specified mobile station, a request message for location registration inclusive of data of the present location of said specified mobile station to said specified control station through said exclusive network; and updating by said specified control station in response to said request message for authentication registration, the location data of said specified mobile station stored in the data base of said specified control station.

19. A location registration control method in a mobile communication network including at least one switching center, a plurality of base stations each of which communicates with a plurality of mobile stations through wireless channels, a plurality of control stations each provided for connecting said switching center and a group of base stations which are under the control of that control station, each of said control stations having a data base for storing terminal information including location data of a plurality of mobile stations positioned in a cell formed by each of base stations which are under the control of that control station, and an exclusive network for interconnecting said plurality of control stations with each other, the method comprising the steps of:

transmitting a location registration signal including the identification number of said one base station and the identification number of a specified mobile station to be subjected to location registration, from one base station to an origination control station connected to said one base station;

broadcasting from said origination control station when said location registration signal is received by said origination control station, a request message for authentication processing for said specified mobile station to a plurality of other control stations through said exclusive network;

performing by a specified control station as a home control station for said specified mobile station in response to the reception of said request message, a predetermined authentication procedure between said specified control station and said specified mobile station and thereafter broadcasting a response message including information indicative of the result of authentication and the address of said specified control station to said origination control station through said exclusive network;

storing terminal information including data of the present location of said specified mobile station into the data base of said origination control station in the case where the result of authentication included in said response message indicates the approval of said specified mobile station, and transmitting a request message for deletion of the location data of said specified mobile station from said origination control station to said specified control station through said exclusive network; and deleting by said specified control station in response to said request message for deletion, the location data of said specified mobile station stored in the data base of said specified control station.

20. A location registration control method in a mobile communication network according to claim 19, further comprising the steps of:

transmitting a request message for transfer of authentication data of said specified mobile station from said origination control station to said specified control station through said exclusive network;

transferring the authentication data of said specified mobile station from said specified control station in response to said request message for transfer to said origination control station through said exclusive network;

transmitting a request message for deletion of the authentication data of said specified mobile station from said origination control station to said specified control station through said exclusive network; and deleting by said specified control station in response to said request message for deletion, the authentication data of said specified mobile station stored in the data base of said specified control station.

* * * * *